(12) United States Patent
Khasin et al.

(10) Patent No.: US 9,941,516 B2
(45) Date of Patent: *Apr. 10, 2018

(54) POROUS CLUSTERS OF SILVER POWDER COMPRISING ZIRCONIUM OXIDE FOR USE IN GAS DIFFUSION ELECTRODES, AND METHODS OF PRODUCTION THEREOF

(75) Inventors: Ernst Khasin, Rehovot (IL); Arie Zaban, Shoham (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 960 days.

This patent is subject to a terminal disclaimer.

(21) Appl. No.: 13/172,100

(22) Filed: Jun. 29, 2011

(65) Prior Publication Data

US 2012/0003549 A1 Jan. 5, 2012

Related U.S. Application Data

(63) Continuation-in-part of application No. 12/441,959, filed as application No. PCT/US2007/079261 on Sep. 24, 2007, now Pat. No. 8,142,938.

(Continued)

(51) Int. Cl.
*H01M 4/54* (2006.01)
*H01M 4/36* (2006.01)
(Continued)

(52) U.S. Cl.
CPC ............. *H01M 4/54* (2013.01); *B01J 21/066* (2013.01); *B01J 23/50* (2013.01); *B01J 35/1009* (2013.01);
(Continued)

(58) Field of Classification Search
CPC .................. H01M 4/34; H01M 12/00; H01M 12/02–12/08; B01J 21/066; B01J 23/50
(Continued)

(56) References Cited

U.S. PATENT DOCUMENTS 3,617,389 A 11/1971 Kuhn et al.
4,341,848 A * 7/1982 Liu et al. .................. 429/406
(Continued)

FOREIGN PATENT DOCUMENTS

EP 0371670 6/1990
EP 2079545 B1 11/2013
(Continued)

OTHER PUBLICATIONS

European Search Report for European Application No. 13184560.4 dated Dec. 16, 2013.
(Continued)

*Primary Examiner* — Maria Laios
*Assistant Examiner* — Robert S Carrico
(74) *Attorney, Agent, or Firm* — Pearl Cohen Zedek Latzer Baratz LLP

(57) ABSTRACT

This invention provides a rechargeable cell comprising an electrode including: a plurality of porous clusters of silver particles, wherein each cluster includes: (a) a plurality of silver particles, and (b) crystalline particles of zirconium oxide ($ZrO_2$), wherein at least a portion of the crystalline particles of $ZrO_2$ is located in pores formed by a surface of the plurality of silver particles. Electrodes of the present invention catalyze the reduction of oxygen in alkaline solution. When the cell is charged, the silver in the electrodes can be oxidized to $Ag_2O$ and further to AgO. Upon discharge, the reduction of the oxidized silver results in additional available energy. This invention provides electrodes for use in rechargeable cells or batteries and methods of making thereof.

6 Claims, 6 Drawing Sheets

Related U.S. Application Data

(60) Provisional application No. 60/846,346, filed on Sep. 22, 2006.

(51) Int. Cl.

| | | |
|---|---|---|
| *H01M 12/08* | (2006.01) | |
| *H01M 4/34* | (2006.01) | |
| *B01J 23/50* | (2006.01) | |
| *B01J 35/10* | (2006.01) | |
| *B01J 21/06* | (2006.01) | |
| *B01J 37/06* | (2006.01) | |
| *B01J 37/08* | (2006.01) | |
| *H01M 4/38* | (2006.01) | |
| *H01M 4/62* | (2006.01) | |
| *H01M 10/42* | (2006.01) | |

(52) U.S. Cl.
CPC ............... *B01J 37/06* (2013.01); *B01J 37/08* (2013.01); *H01M 4/34* (2013.01); *H01M 4/364* (2013.01); *H01M 12/08* (2013.01); *H01M 4/38* (2013.01); *H01M 4/62* (2013.01); *H01M 10/4235* (2013.01); *H01M 2010/4292* (2013.01); *Y02E 60/128* (2013.01)

(58) Field of Classification Search
USPC .................................................. 429/402–407
See application file for complete search history.

(56) References Cited

U.S. PATENT DOCUMENTS

| | | | |
|---|---|---|---|
| 4,407,907 A | | 10/1983 | Takamura et al. |
| 4,569,924 A | * | 2/1986 | Ozin et al. ................... 502/184 |
| 4,810,594 A | | 3/1989 | Bregoli et al. |
| 4,877,694 A | | 10/1989 | Solomon et al. |
| 5,064,735 A | * | 11/1991 | Rampel et al. ............... 429/206 |
| 5,190,833 A | | 3/1993 | Goldstein et al. |
| 5,242,765 A | | 9/1993 | Naimer et al. |
| 5,312,701 A | | 5/1994 | Khasin et al. |
| 5,418,080 A | | 5/1995 | Korall et al. |
| 5,476,535 A | | 12/1995 | Khasin |
| 5,532,086 A | | 7/1996 | Thibault et al. |
| 5,618,392 A | * | 4/1997 | Furuya ........................ 204/252 |
| 5,670,270 A | | 9/1997 | Wallin |
| 6,632,557 B1 | * | 10/2003 | Curelop et al. ............... 429/405 |
| 6,676,913 B2 | | 1/2004 | Rossin |
| 2003/0064265 A1 | | 4/2003 | Hampden-Smith et al. |
| 2004/0230083 A1 | | 11/2004 | Weisbeck et al. |
| 2005/0003271 A1 | | 1/2005 | Jiang et al. |
| 2005/0260464 A1 | | 11/2005 | Raiford et al. |
| 2006/0175195 A1 | | 8/2006 | Yamada et al. |
| 2008/0096061 A1 | * | 4/2008 | Burchardt ....................... 429/13 |
| 2009/0209415 A1 | | 8/2009 | Kayama et al. |

FOREIGN PATENT DOCUMENTS

| | | |
|---|---|---|
| JP | 2003-527735 | 9/2003 |
| JP | 2006-005257 | 1/2006 |
| JP | 2006-212464 | 8/2006 |
| JP | 2006-255610 | 9/2006 |
| WO | WO 2008/036962 A2 | 3/2008 |

OTHER PUBLICATIONS

Kundakovic et al. "Deep Oxidation of Methane over Zirconia-Supported Ag Catalysts," Appl. Catal. A: General 183, 35-51 (1999).

Japanese Office Action Application No. JP2009-529424 dated Oct. 1, 2012.

European Search Report Application No. 07843037.7 dated Dec. 9, 2011.

Bogdanchikova et al. "Adsorption and Catalytic Properties of Highly Disperse Silver Catalysts" Proceedings of the 10$^{th}$ International Congress on Catalysis, Jul. 1992.

G. F. McLean et al. "An assessment of alkaline fuel cell technology" Int journal of hydrogen energy 27,p. 508 (2002).

Kordesch et al.; "Fuel Cells: and Their Applications", Chapter 3. Basic Principles, Sub-chapter: Electrocatalysts, Apr. 3, 2006, pp. 40-42.

O. Ichinose et al. Effect of silver catalyst on the activity and mechanism of a gas diffusion type oxygen cathode for chlor-alkali electrolysis, J. of Applied Electrochemistry 34, 55-59, (2004).

N. Furuya, H. Aikawa. "Comparative study of oxygen cathodes loaded with Ag and Pt catalysts in chlor-alkali membrane cells" Electrochimica Acta 45 4251-4256, (2000).

Y. Shimizu et al. "Bi-functional oxygen electrode using large surface area La1-xCaxCoO3 for rechargeable metal-air battery" J. Electrochemical. Soc., vol. 137, #11, Nov. 1990.

L. Carlsson and L. Ojefors. Bifunctional air electrode for metal-air batteries, J. Electrochemical Soc., pp. 525-528. Mar. 1980.

S. Gamburzev et al. "Development of a novel metal hydride-air secondary battery" J. of Applied Electrochemistry, 28, 545-549. (1998).

W.H. Zhu et al. "New structures of thin air cathodes for zinc-air batteries" J. of Applied Electrochemistry, 33, 29-26, (2003).

YiYun Yang et al. Novel bi-functional non-noble-metal catalyst for oxygen electrochemistry, ECS 210th Meeting, Abstract 0380, (2006).

Y. Hattory et al. "Titanium based air electrodes for secondary air batteries" ECS 210th Meeting, Abstract 0383, (2006).

T. Blakley et al. "Air breathing MnO2 cathodes in alkaline electrolytes" ECS 210th Meeting, Abstract 0386, (2006).

D. Linden and T. Reddy. "Handbook of batteries" third edition, pp. 38.5—Air electrode, (2001).

* cited by examiner

POROUS CLUSTERS OF SILVER POWDER COMPRISING ZIRCONIUM OXIDE FOR USE IN GAS DIFFUSION ELECTRODES, AND METHODS OF PRODUCTION THEREOF

CROSS REFERENCE TO RELATED APPLICATIONS

This application is a Continuation-In-Part Application of U.S. patent application Ser. No. 12/441,959, filed on Dec. 11, 2009 now U.S. Pat. No. 8,142,938 which is a National Phase application of PCT International Application Number PCT/US2007/079261, international filing date Sep. 24, 2007 claiming priority from U.S. provisional application Ser. No. 60/846,346 filed on Sep. 22, 2006 which are incorporated in their entirety herein by reference.

FIELD OF THE INVENTION

The present invention relates to silver-based electrodes having porous clusters of silver powder comprising zirconium oxide, to mixes thereof and to electrochemical cells comprising such electrodes and to methods of making thereof.

BACKGROUND OF THE INVENTION

Electrically rechargeable (or secondary) metal-air cells or batteries are very attractive power sources in light of their potential high energy density. In this type of cells the oxidizing reactant (oxygen) which undergoes reduction during discharge is supplied from outside the cell. This reaction of oxygen reduction occurs in the presence of water and gives hydroxide ions (OH$^-$). The oxygen is reduced on the surface of the cathode during discharge. The cathode comprises a material that catalyzes the above-mentioned oxygen reduction. Such catalyst includes, inter alia, silver, platinum, perovskite-type oxides, mixed metal oxides with spinel structure etc.

However, until now this type of cells or batteries has not been satisfactory realized because of the degradation of the catalyst material during recharging.

There are many uses for silver catalysts, including the chemical industry (e.g., in reaction of ethylene oxidation), cells or batteries (both primary and rechargeable) and fuel cells with alkaline electrolyte, oxygen sensors, and electrolysis cells.

Sub-micron and nano-size silver metal powder and silver based bulk alloy catalysts can be produced by different methods, including the Raney method of making a "skeleton" catalyst from Ag—Ca, Ag—Mg, Ag—Al and others alloys, chemical precipitation, leaching of Al from heat treated strips of Al—Ag alloys (see, by way of example, U.S. Pat. No. 5,476,535, which is incorporated herein by reference).

The above methods result in a porous silver agglomerate or cluster of primary particles in a range of sizes from tenths of microns to a few millimeters, consisting of primary particles having an average size from about sub-micron to a few hundred microns.

While all the above-described methods can produce silver powder catalysts having sub-micron or nano-size primary particles, these techniques have been found to have a drawback if the final product is used as a catalyst for air or oxygen electrodes for batteries and fuel cells with alkaline electrolyte. This drawback relates to the phenomenon of silver catalyst dissolution in alkaline electrolyte.

Silver, by itself, has a very low rate of dissolution in alkaline solutions. On the other hand, silver oxides have a much higher dissolution rate. At an anodic oxidation of silver in alkaline solution, the first phase transition at a potential of +0.24V (here and throughout this application the potentials are vs. Hg/HgO reference electrode) is Ag→Ag$_2$O. The next phase transition is Ag$_2$O→AgO at a potential of about +0.5V.

These values of potentials were determined in various classic studies for smooth silver foil (see M. Pourbaix, Atlas of Electrochemical Equilibria in Aqueous Solutions, (1966), p. 393). For fine silver powder and for any kind of nano-sized silver catalyst in particular, the formation of silver oxides starts at much more cathodic potentials. Y. Golin, et al. (Electrochimia, Vol. 18, p. 1223) disclose that Ag$_2$O appears on the surface of ultra-fine silver catalyst at a potential of about +0.1V. This range of potentials corresponds to the open circuit voltage (OCV) of oxygen/air electrodes in alkaline electrolyte. If a silver-catalyzed cathode works as a bi-functional electrode, the potentials in the charge mode of operation could reach +0.4-0.5V and even higher, until the process of oxygen evolution occurs. This means that substantially all the problems of silver catalyst dissolution result from the formation of different types of silver oxides at OCV and anodic polarization, and their subsequent decomposition and precipitation.

While there has been some discussion in the technical literature as to the nature of the dissolution of silver oxide, it is generally agreed that the silver is present in alkaline electrolyte in the form of anions, like Ag(OH)$_2^-$ or AgO$^-$ (H. Fleischer, (ed.), Zinc-Silver Oxide Batteries, J. Wiley (1971)), and has a tendency, during decomposition, to slowly form a finely divided black deposit of metallic silver. The rate of decomposition increases with increasing concentration of dissolved silver oxide, temperature and the presence of various kinds of impurities.

The precipitated silver black has tremendous diffusion ability, which results in roughening of the primary ultra fine porous structure, decreased surface area of the catalyst, and correspondingly, reduced electrode performance.

While the dissolution of silver may be inhibited or diminished by deliberate, continuously maintained polarization of the electrochemical power sources having silver-catalyzed or bulk-silver-alloy-catalyzed air or oxygen cathodes, this is highly disadvantageous, and in many cases, practically impossible.

There is therefore a recognized need for, and it would be highly advantageous to have, a silver material, modified chemically, that inherently is stable and resistant to dissolution.

SUMMARY OF THE INVENTION

In one embodiment, this invention provides a tri-functional gas-diffusion electrode comprising: a porous cluster of silver particles and crystalline particles of ZrO$_2$, wherein said ZrO$_2$ particles reside on the surface of the silver particles and wherein said electrode performs three functions:
  a. the electrode functions as a catalyst for the reduction of oxygen (O$_2$) to hydroxide (OH$^-$) ions when said electrode is used as a cathode in an electrochemical cell working in a discharge mode;
  b. in alkaline solution, when used as an anode in an electrochemical cell working in a charge mode, the electrode is oxidized such that in a subsequent discharge mode, said electrode provides additional energy.

c. the electrode functions as a counter/auxiliary electrode for the oxidation of hydroxide ($OH^-$) ions to oxygen ($O_2$) when used as an anode in an electrochemical cell working in said charge mode;

In one embodiment, this invention provides a rechargeable cell comprising a tri-functional gas-diffusion electrode, wherein the tri-functional gas-diffusion electrode comprising: a porous cluster of silver particles; wherein the electrode performs three functions:

a. the electrode functions as a catalyst for the reduction of oxygen ($O_2$) to hydroxide ($OH^-$) ions when said electrode is used as a cathode in a discharge mode;

b. the electrode is oxidized in the charge mode such that in a subsequent discharge mode, said electrode provides additional energy.

c. the electrode functions as a counter/auxiliary electrode for the oxidation of hydroxide ($OH^-$) ions into oxygen ($O_2$) in a charge mode;

In one embodiment, the electrode further comprises crystalline particles of $ZrO_2$. In one embodiment, the $ZrO_2$ particles reside on the surface of the silver particles.

In one embodiment, the electrode of this invention comprises two discharge voltages when used in a discharge mode in an air-zinc cell. In one embodiment, the two discharge voltages are approximately 1.2 V-1.6 V (first discharge voltage) and approximately 1.1 V-1.3 V (second discharge voltage) when the electrode is used in said discharge mode. In one embodiment, the two discharge voltages correspond to a first and to a second process. In one embodiment, the first process comprises the reduction of AgO to $Ag_2O$, and the reduction of $Ag_2O$ to Ag; and the second process comprises the reduction of $O_2$ to $OH^-$ in the presence of water. In one embodiment, the discharge voltages depend on the current density. In another embodiment, the electrode is a gas-diffusion electrode.

In one embodiment, the electrode comprises two charge voltages when used in a charge mode. In one embodiment, the two charge voltages are approximately 2.0 V-2.4 V (first charge voltage) and approximately 2.4 V-2.8 V (second charge voltage) respectively when said electrode is used in a charge mode in an air-zinc cell. In one embodiment, the two charge voltages correspond to a first and to a second process. In one embodiment, the first process comprises the oxidation of Ag to $Ag_2O$; and the second process comprises the oxidation of $Ag_2O$ to AgO. In another embodiment, the electrode is a gas-diffusion electrode.

In one embodiment, the total discharge capacity ranges between 0.1 Ah and 5000 Ah. In one embodiment, the total discharge capacity is 4.23 Ah. In one embodiment, the average discharge energy ranges between 0.1 Wh and 7000 Wh. In one embodiment, the average discharge energy is 5.5 Wh.

In one embodiment, the total charge capacity ranges between 0.1 Ah and 5000 Ah. In one embodiment, the total charge capacity ranges between 4.5 Ah and 5.5 Ah. In one embodiment, the average charge energy ranges between 0.1 Wh and 7000 Wh. In one embodiment, the average charge energy ranges between 10.5 Wh and 11.5 Wh. In one embodiment, the cell is a metal-air electrically-rechargeable cell. In one embodiment, the rechargeable cell is a metal-air rechargeable cell and the second electrode in the rechargeable cell (the anode in the discharge mode) is selected from the group consisting of iron, zinc, magnesium, lithium, aluminum, and alloys and mixtures thereof.

In one embodiment, the additional energy provided by the cell as a result of silver oxide reduction processes represents 10% of the total energy provided by the cell in the discharge mode.

In one embodiment, the silver particles have an average size of up to 100 nm. In one embodiment, the pores in said porous cluster have an average characteristic diameter of between 15 to 80 nm. In one embodiment, the crystalline particles of $ZrO_2$ have an average particle size of less than about 20 nm. In one embodiment, the electrode further comprises a current collector. In one embodiment, the current collector is selected from the group consisting of metal screen, metal wire mesh, non-woven metal fiber mat, perforated metal sheet and expanded metal foil. In one embodiment, the current collector comprises nickel, nickel alloy, steel, stainless steel, silver, silver-coated nickel alloys, silver-coated steel and silver coated stainless steel. In one embodiment, the electrode further comprises a hydrophobic, polymeric porous gas-diffusion layer. In one embodiment, the electrode further comprises a water-repellant polymer. In one embodiment, the water repellant polymer is selected from a group consisting of paraffins and hydrophobic polymers. In one embodiment, the hydrophobic polymers comprise fluorinated polymers. In one embodiment, the fluorinated polymers comprise polytetrafluoroethylene, fluorinated ethylene-propylene, a perfluoroalkoxy polymer resin, chlorotrifluoroethylene, polyvinylidene fluoride or a combination thereof. In one embodiment, the water-repellant polymer is mixed with said cluster comprising silver and $ZrO_2$ to form an active mix. In one embodiment, the electrode is a gas-diffusion air/oxygen electrode. In one embodiment, the electrode is used in metal-air electrically rechargeable cells or batteries. In one embodiment, the $ZrO_2$ content in the $Ag/ZrO_2$ cluster ranges between 0.2-2%. In one embodiment, the size of the $ZrO_2$ particles ranges between 2-30 nm.

In one embodiment, the electrode is used in cells other than air-zinc cell. In one embodiment, when the electrode is used in a cell other than air-zinc cell, other discharge voltages and other charge voltages may be measured. Voltages of other cells in which electrodes of this invention are employed depend on cell characteristics.

In one embodiment, the cell is an electrically rechargeable cell. In one embodiment, the electrically rechargeable cell is a metal-air electrically rechargeable cell.

In one embodiment, the second electrode in the metal-air electrically rechargeable cell (the anode in the discharge mode) is selected from the group consisting of iron, zinc, magnesium, lithium, aluminum, and alloys and mixtures thereof.

In one embodiment, the additional energy provided by the cell as a result of silver oxide reduction processes represents 10% of the total energy provided by the cell in the discharge mode.

In one embodiment, the energy provided by the cell as a result of silver oxide reduction processes is in addition to the energy provided by the cell as a result of oxygen reduction in the discharge mode.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION

Figure 1:
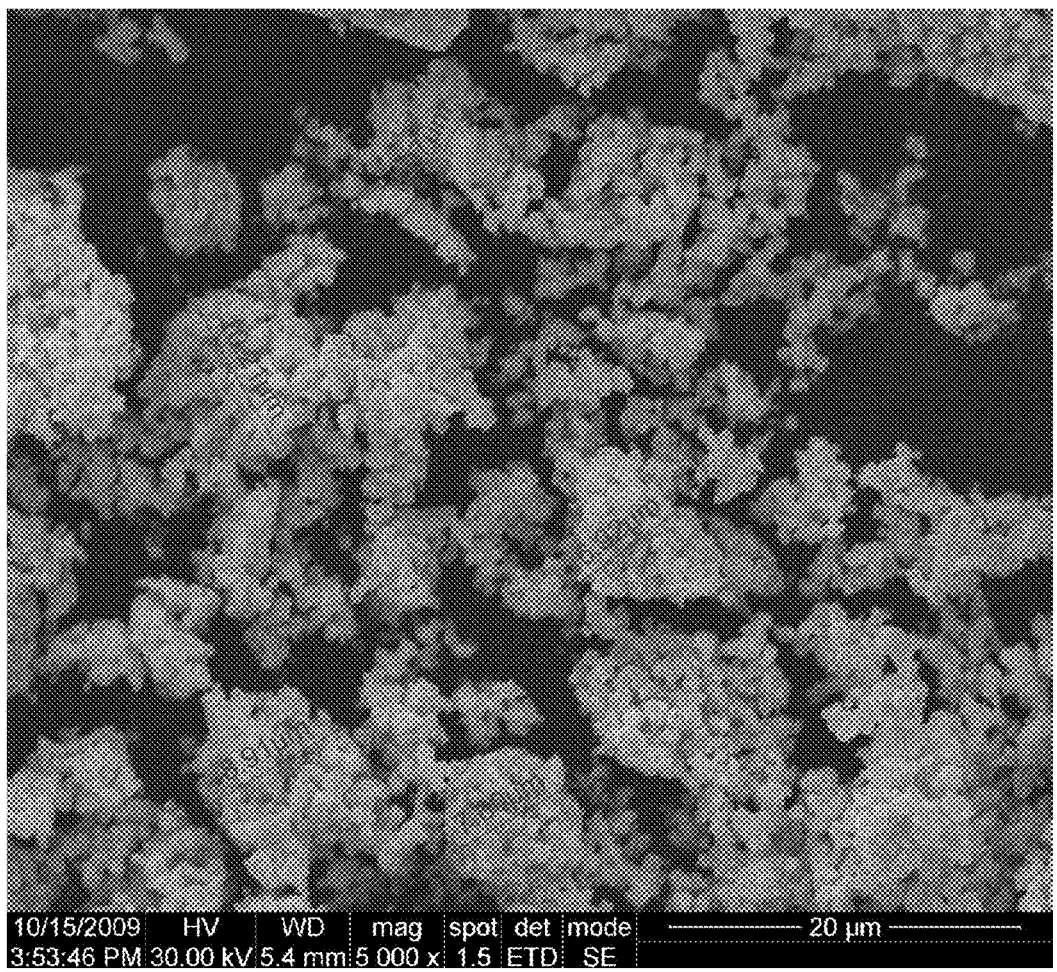
FIG. 1 is a scanning electron microscope (SEM) image of porous clusters of silver particles; the clusters comprising $ZrO_2$ particles ($ZrO_2$ particles are too small to resolve)

In one embodiment, this invention is directed to silver based electrodes containing porous silver agglomerates or clusters of silver particles; and crystalline particles of $ZrO_2$, wherein the $ZrO_2$ particles reside on the surface of the silver particles.

In one embodiment, this invention provides an air-electrode for metal-air cells or batteries which enables to provide the following functions:
  reduction of oxygen and formation of hydroxide ions (discharge operation);
  conversion of hydroxide ions into oxygen (charge operation); and
  being oxidized during the charge operation, such that during a subsequent discharge operation, an additional energy is provided by reduction of the oxidized material.

In one embodiment, the air electrode comprises silver porous clusters. In one embodiment, the air electrode comprises silver porous clusters alloyed on the surface by zirconium oxide.

In one embodiment, this invention is directed to a method of making a silver based electrode of this invention. In one embodiment the electrode is a carbonless electrode.

In one embodiment, this invention is directed to uses of a silver-based electrode of this invention as a gas diffusion air cathode of metal-air cells or batteries and particularly for metal-air electrically rechargeable cells or batteries with alkaline electrolyte.

In one embodiment, this invention is directed to metal-air cells or batteries comprising the silver based electrode of this invention. In another embodiment, this invention is directed to zinc-air electrically rechargeable cells or batteries. In one embodiment, this invention is directed to multiple-cycle operation of durable zinc-air electrically rechargeable cells or batteries. Such cells or batteries are suitable for electrically-powered devices, electric vehicles, electronics, drones, medical devices and as auxiliary power.

In one embodiment, this invention is directed to metal-air electrically rechargeable batteries or cells. In another embodiment, the air cathode of the rechargeable cell of this invention may be bi-functional or trifunctional, providing the two or more of the following functions:
1) catalytic reduction of oxygen and formation of hydroxide ions when providing electrical current (discharge mode of operation);
2) conversion of the hydroxide ions back into oxygen when current is supplied to it (charge mode of operation).
3) oxidation of silver to various silver oxide species in a charge mode of operation, such that in a subsequent discharge mode, the electrode supplies additional energy.

In one embodiment, this invention provides a catalyst-mix including a silver-based catalyst and a water repellant polymer, wherein the silver-based catalyst includes silver porous clusters of silver particles and crystalline particles of $ZrO_2$, wherein the $ZrO_2$ particles reside on the surface of the silver particles. In another embodiment, this invention is directed to a gas diffusion electrode containing a silver-based catalyst of this invention. In another embodiment, this invention is directed to a gas diffusion electrode containing a catalyst-mix of this invention.

In one embodiment, this invention provides, a silver-based catalyst, a catalyst active mix air-electrode and metal-air cells or batteries comprising silver porous clusters of silver particles and crystalline particles of $ZrO_2$. An example of clusters of silver particles can be seen in FIG. 1. FIG. 1 is a scanning electron microscope (SEM) image of porous clusters of silver particles.

Figure 4:
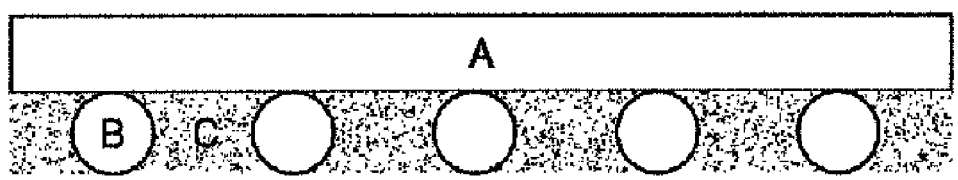
FIG. 4 is a schematic drawing of one embodiment of an air cathode structure; an active catalyst mix C is distributed around and in direct contact with at least one current collector B. Active catalyst mix C and current collector B are together located on one broad face of a hydrophobic layer A.
Figure 5:
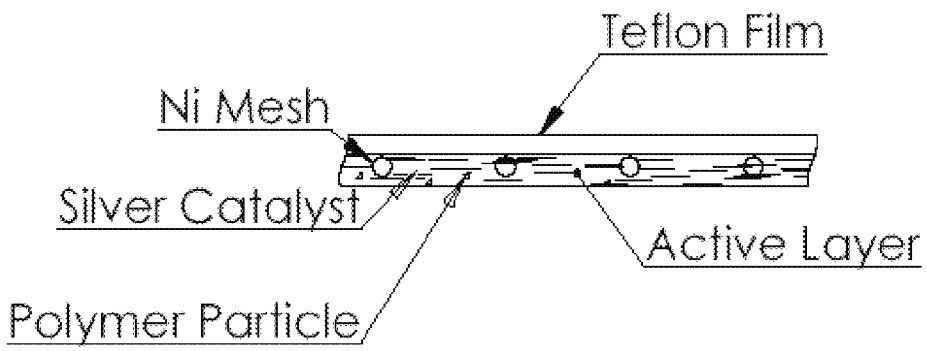
FIG. 5 is a schematic illustration of one embodiment of an air/oxygen electrode.

An example for an electrode of this invention is given in FIG. 4. FIG. 4 is a schematic drawing of an air cathode structure, wherein an inventive active catalyst mix C is distributed around and in direct contact with at least one current collector B. Active catalyst mix C and current collector B are together located on one broad face of a hydrophobic layer A.

The present invention also relates to the application of the inventive catalyst mixes and the inventive gas diffusion electrodes in metal-air rechargeable cells or batteries. In one embodiment, the cell is an electrically rechargeable cell.

The present invention also relates to the application of the inventive catalyst mixes and the inventive gas diffusion electrodes in alkaline electrolyte electrochemical cells. In one embodiment, the alkaline electrolyte electrochemical cells, is an alkaline fuel cell, a metal hydride anode alkaline fuel cell, a metal-air non-rechargeable cell or batteries, oxygen sensors, and electrolysis cells, such as but not limited to chlor-alkali cells.

One aspect of the present invention relates to silver-based catalysts containing porous clusters of silver particles (silver powder) wherein the clusters further comprise smaller zirconium oxide particles. The zirconium oxide particles are in contact with the surface of the silver particles. The invention further relates to a method of making the silver-based catalysts.

The principles and operation of the inventive catalysts, catalyst active mixes, electrodes, and methods of production thereof may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In one embodiment, the present invention provides a catalyst for air cathodes of electrically rechargeable metal-air cells or batteries. The catalyst enables to successfully provide the following three functions:

1) catalytic reduction of oxygen and formation of hydroxide ions when providing electrical current (discharge mode of operation);
2) conversion of hydroxide ions back into oxygen when current is supplied to it (charge mode of operation).
3) during the charge operation the catalyst may be converted into an oxide form, such that it provides additional energy by reduction of this oxidized catalyst during a subsequent discharge operation until the catalyst is completely reduced and starts to perform according to the first function—as a catalyst for the electrochemical reduction of oxygen.

In one embodiment, after deep electrochemical oxidation and reduction the catalyst retains its morphology or portions of it and it retain its catalytic activity in the electrochemical reduction of oxygen. The porous clusters of silver powder alloyed by zirconium oxide as described herein are an outstanding candidate for this application.

In one embodiment, the catalyst of this invention comprises clusters comprising metals from the transition metals group (e.g. Ag, Fe, Ru, Pd, Pt), salts, oxides or alloys thereof, which can be used to form the catalyst material in electrodes of this invention. In one embodiment, the catalyst of this invention includes clusters comprising metals from the transition metals group (e.g. Ag, Fe, Ru, Pd, Pt) salts, oxides or alloys thereof, wherein crystalline particles of zirconium oxide ($ZrO_2$), are located in pores within the cluster of the plurality of the transition metal particles. In one embodiment, "primary particles" refer herein to the transition metal particles forming the clusters, wherein "secondary particles" refer herein to the crystalline particles of e.g. zirconium oxide ($ZrO_2$) which resides on the surface of the transition metal particles.

According to the teachings of the present invention there is provided a catalyst including: a plurality of porous clusters of primary particles, each cluster of the clusters including: (a) a plurality of primary particles, and (b) crystalline particles of zirconium oxide ($ZrO_2$), wherein at least a portion of the crystalline particles of $ZrO_2$ is located in pores within the cluster of the plurality of primary particles. In one embodiment, the zirconium oxide particles are deposited on the surface of the primary particles. In one embodiment, the primary particles are silver particles.

In one embodiment, this invention provides a catalyst-mix including a catalyst of this invention and a water repellant polymer. In one embodiment, the water-repellant polymer is selected from the group of water-repellant polymers consisting of paraffins and hydrophobic polymers. In one embodiment, the hydrophobic polymers include fluorinated polymers. In one embodiment, the fluorinated polymers include polytetrafluoroethylene, fluorinated ethylene-propylene, a perfluoroalkoxy polymer resin chlorotrifluoroethylene, and a polyvinylidene fluoride.

In one embodiment, this invention provides an air electrode including:
(a) an active catalyst-mix, including:
    (i) porous agglomerates or porous clusters of primary particles, and
    (ii) crystalline secondary particles of zirconium oxide ($ZrO_2$), wherein at least a portion of the crystalline secondary particles of $ZrO_2$ is located in pores of the agglomerate or cluster formed by the plurality of primary particles; and
    (iii) a water repellant polymer; and
(b) an electrically conductive current collector having a specific electrical resistivity below $1*10^{-5}$ ohm meters; and
(c) a porous hydrophobic film, wherein the active mix and the current collector are located together on a single broad face of the porous hydrophobic film, the active mix and the current collector being bonded to the hydrophobic film.

In one embodiment, the primary particles are silver particles. In one embodiment, the water repellant polymer is in the form of particles.

In one embodiment, the current collector is selected from the group consisting of metal screen, metal wire mesh, non-woven metal fiber mat, perforated metal sheet, metal foam and expanded metal foil. For example metal foam can be made by melting a mixture of metal and plastic and removing the plastic.

In some embodiments, this invention provides an electrode comprising a current collector. In one embodiment, the current collector includes a material selected from the group consisting of nickel, nickel alloys, steel, stainless steels, silver, silver-coated nickel, silver-coated nickel alloys, silver-coated steel, silver-coated stainless steel. In one embodiment, the current collector is coated with silver.

In one embodiment, the porous hydrophobic film is selected from the group of porous hydrophobic films consisting of polytetrafluoroethylene, fluorinated ethylene-propylene, perfluoroalkoxy polymer resin, chlorotrifluoroethylenes, and polyvinylidene fluorides.

In one embodiment, the air electrode consists essentially of: (a) an active mix of silver catalyst; (b) a current collector, and (c) a porous hydrophobic film.

In one embodiment, this invention provides an air electrode including:
(a) a catalyst comprising a plurality of porous agglomerates or porous clusters of silver particles, wherein each of said porous agglomerate or porous cluster include:
    (i) a plurality of primary particles; and
    (ii) crystalline secondary particles of zirconium oxide ($ZrO_2$),
wherein at least a portion of the crystalline secondary particles of $ZrO_2$ is located in pores formed inside of the agglomerate or of the cluster of the plurality of silver particles;
(b) a current collector, and
(c) a porous hydrophobic film;

wherein the catalyst and the current collector are located together on a single broad face of the porous hydrophobic film, the catalyst and the current collector being bonded to the hydrophobic film.

In one embodiment, the pores formed by the plurality of particles are formed within the agglomerate or the cluster.

In one embodiment, this invention provides an air electrode including:
(a) an active mix of silver catalyst, wherein said catalyst comprising a plurality of agglomerates or porous clusters, wherein each of said agglomerate or cluster include:
  (i) a plurality of primary particles, and
  (ii) secondary crystalline particles of zirconium oxide ($ZrO_2$), wherein at least a portion of the crystalline particles of $ZrO_2$ is located in pores formed within the agglomerate or cluster comprising the plurality of primary particles, and
(b) a porous hydrophobic film, wherein the active mix of silver catalyst is located on a single broad face of the porous hydrophobic film, the active mix being bonded to the hydrophobic film.

In one embodiment, this invention provides an air electrode including:
(a) a catalyst having a plurality of porous clusters of primary particles, each of said cluster includes:
  (i) a plurality of primary particles, and
  (ii) crystalline secondary particles of zirconium oxide ($ZrO_2$);
wherein at least a portion of the crystalline particles of $ZrO_2$ is located in pores formed within the agglomerate or cluster comprising the plurality of primary particles; and
(b) a porous hydrophobic film;
wherein the catalyst is disposed on, and bonded to, a single broad face of the porous hydrophobic film.

In one embodiment, the primary particles are silver particles.

In one embodiment, this invention provides a tri-functional electrode comprising:
a porous cluster of silver particles; and
crystalline particles of $ZrO_2$;
wherein said $ZrO_2$ particles reside on the surface of the silver particles and wherein said electrode performs three functions:
  a. the electrode functions as a catalyst for the reduction of oxygen ($O_2$) to hydroxide ($OH^-$) ions when said electrode is used as a cathode in a discharge mode;
  b. in alkaline solution, the electrode is oxidized in the charge mode such that in a subsequent discharge mode, said electrode provides additional energy;
  c. the electrode functions as a counter/auxiliary electrode for the oxidation of hydroxide ($OH^-$) ions into oxygen ($O_2$) when used as an anode in a charge mode.

In one embodiment, the electrode of this invention includes carbon powder. In one embodiment, the electrode includes a mixture including the active catalyst-mix and carbon powder. In one embodiment, the air electrode includes a mixture including the catalyst as described herein and carbon.

In another embodiment, the electrode does not include carbon.

In one embodiment, this invention provides an electrochemical cell including:
(a) anode;
(b) air electrode as described hereinabove, the air electrode being adapted to function as a cathode; and
(c) electrolyte.

In another embodiment, the electrochemical cell is an air-metal rechargeable cell. In one embodiment, the electrochemical cell is a metal-air electrically rechargeable cell.

In one embodiment, the electrolyte is an alkaline electrolyte, and the cell is an alkaline electrolyte electrochemical cell.

In another embodiment, the electrochemical cell is selected from the group consisting of alkaline fuel cells, metal hydride anode alkaline fuel cells, metal-air non-rechargeable cells or batteries, oxygen sensors, and electrolysis cells. In one embodiment, the electrolysis cells include chlor-alkali cells.

In one embodiment, the alkaline fuel cell is adapted to consume an anode fuel selected from the group of anode fuels consisting of hydrogen, ethanol, methanol, aqueous solutions of ethanol, and aqueous solutions of methanol.

In one embodiment, the alkaline fuel cells are adapted to use as the fuel for the cathode a fuel selected from the group consisting of air, air filtered to remove carbon dioxide, and oxygen.

In one embodiment, the electrochemical cell is a metal-air electrically rechargeable cell, and the anode is selected from the group consisting of iron, zinc, magnesium, lithium, aluminum, alloys of these metals, and mixtures thereof.

In one embodiment, this invention provides an alkaline electrolyte electrochemical cell includes (a) an anode; (b) a cathode, and (c) an alkaline electrolyte, wherein the cathode includes the catalyst as described hereinabove.

In one embodiment, this invention provides an alkaline electrolyte electrochemical cell includes: (a) an anode; (b) a cathode, and (c) an alkaline electrolyte, wherein the cathode includes the active catalyst mix as described hereinabove.

In one embodiment, this invention provides an air-metal rechargeable cell including: (a) an anode; (b) a cathode, and (c) an alkaline electrolyte, wherein the cathode includes the active catalyst mix as described hereinabove.

In one embodiment, this invention provides a rechargeable cell comprising a tri-functional electrode, wherein the tri-functional electrode comprising:
a porous cluster of silver particles;
crystalline particles of $ZrO_2$;
wherein the electrode performs three functions:
  a. the electrode functions as a catalyst for the reduction of oxygen ($O_2$) to hydroxide ($OH^-$) ions when said electrode is used as a cathode in a discharge mode;
  b. the electrode is oxidized in the charge mode such that in a subsequent discharge mode, said electrode provides additional energy;
  c. the electrode functions as a counter/auxiliary electrode for the oxidation of hydroxide ($OH^-$) ions into oxygen ($O_2$) in a charge mode.

In one embodiment, this invention provides a method of producing a nano-size silver catalyst comprising zirconium oxide, the method including: (a) providing a silver powder containing a porous agglomeration of silver particles, the particles having an average primary particle size of up to 150 nanometers; (b) impregnating the agglomeration of silver particles by contacting the particles with an aqueous solution containing a zirconium (IV) compound selected from the group consisting of zirconium (IV) dinitrate oxide hydrate and zirconium (IV) dichloride oxide hydrate, so as to form a suspension; (c) contacting the suspension with an aqueous alkaline solution to produce zirconium hydroxide, which precipitates in pores of the porous agglomeration; (d) rinsing and drying the agglomerates with the zirconium hydroxide precipitated in the pores to produce a dried residual material, and (e) heating the dried residual material, preferably at 250-300° C. (250-300 degrees Celsius) for 10 to 60 minutes to effect dehydration, and subsequently, heating at 400-550° C. for 10 to 30 minutes to produce crystals of zirconium oxide, thereby forming the nano-size silver catalyst in contact with zirconium oxide.

In one embodiment, the rinsing is performed so as to bring the solution to a pH in a range of 6 to 8.

In one embodiment, the alkaline solution includes a metal hydroxide selected from the group consisting of potassium hydroxide and sodium hydroxide.

In one embodiment, the air electrode, for use in alkaline electrochemical cells, includes: (a) an active catalyst-mix substantially as described herein, wherein the catalyst is present at about 84% by weight, and polytetrafluoroethylene (i.e. the water repellant polymer) is present at about 16%. In another embodiment, the size of the porous cluster of silver particles comprising zirconium oxide (IV) is in the range of 3 to 25 microns. In one embodiment, the active layer comprises the active mix and the current collector. In one embodiment, the thickness of the active layer ranges between 100 micrometers and 800 micrometers. The crystallized particles of $ZrO_2$ (IV) are located in the pores of the silver agglomerate on the surface of the primary particles and their size is less than 20 nanometers and most preferably is about 3-5 nanometers; the average agglomerate porosity is in the range of 35% to 45%; the average pore size distribution is preferably between 50 nanometers and 80 nanometers; the B.E.T. specific surface area of the porous cluster is preferably between 6 and 10 square meters per gram; the tap density in units of grams per cubic centimeter is in the range of preferably between 1.5 and 2.5 g/cc; the purity of the silver in the catalyst is preferably in the range of 99.6% to 99.95%; the zirconium oxide content in the catalyst porous cluster is preferably between 0.1% to 4%; In one embodiment, the zirconium oxide content in the catalyst porous cluster is preferably between 0.4% and 1.0%; and the minimum purity of the promoted catalyst, i.e., silver and zirconium oxide together, is at least 99.7% by weight; (b) a metal current collector in mesh, screen, or expanded perforated foil format wherein such metal is either nickel, stainless steel, or such metals coated with silver, and (c) a porous polytetrafluoroethylene film.

Definitions

As used herein in the specification and in the claims section that follows, the terms "air cathode" and "oxygen cathode" are used interchangeably to refer to a gas diffusion electrode used as the site of the reaction of oxygen in an electrochemical cell. In one embodiment, gas diffuses to the surface of the electrode and gaseous oxygen is being reduced on the surface of the electrode.

In one embodiment, the term "tri-functional electrode" means that the electrode, when in use in a battery or in an electrochemical cell performs three functions. (1) In a discharge mode it serves as a catalyst for the reduction of oxygen to hydroxide ions and as the site for this reduction process; and (2) in a charge mode the electrode itself is at least partially oxidized such that in a subsequent discharge mode, reduction of the oxidized electrode yields additional energy that can be used by the load or by any device powered by the cell or by the electrochemical cell; (3) additionally, in a charge mode the electrode serves as the site of oxidation of hydroxide ions back into oxygen, i.e. the electrode serves as a counter/auxiliary electrode for oxidation of hydroxide ions into oxygen.

In one embodiment, the $ZrO_2$ particles reside on the surface of the primary particles to form clusters. In one embodiment, this means that the $ZrO_2$ particles are formed on the surface of the primary particles that is exposed to the environment. In one embodiment, the $ZrO_2$ particles are present between two or more primary particles and are in contact with one or more primary particles. In one embodiment, the $ZrO_2$ particles are found in interstices between neighboring primary particles. In one embodiment, because the clusters of primary particles comprising pores, the $ZrO_2$ particles are located within the pores of the primary clusters, in contact with one or more primary particles. In one embodiment, the $ZrO_2$ particles are smaller than the primary particles. In one embodiment, the $ZrO_2$ particles are in contact with one or more neighboring $ZrO_2$ particles. In one embodiment, the $ZrO_2$ particles are on the outermost surface of the electrode, adsorbed on primary particles that form the external layer of the cluster. In one embodiment, the $ZrO_2$ particles stabilize the cluster. In one embodiment, the $ZrO_2$ particles stabilize the cluster(s) with regards to degradation during an electrochemical process. In one embodiment, the $ZrO_2$ particles stabilize the cluster in elevated temperature. In one embodiment, the primary particles are silver particles.

In one embodiment, "porous" cluster means that the cluster comprising pores. In one embodiment, a porous cluster comprises a larger surface area than a non-porous cluster. In one embodiment, a porous cluster can be seen in FIG. 1. In one embodiment, the pores in the cluster are accessible to gas, to solution or to a combination thereof. In one embodiment, portions of the surface of silver particles within pores of the porous cluster are available to catalyze chemical and/or electrochemical reactions.

In one embodiment, a "cluster" of particles means a group of particles. In one embodiment, a cluster of particles means an array of bound particles. In one embodiment a cluster is an ensemble of particles bound together. In one embodiment, clusters comprising silver particles are shown in FIG. 1. The spheres in the image are the individual particles.

In one embodiment, the term "discharge voltage" is the voltage measured between the anode and the cathode of a cell or an electrochemical cell.

In one embodiment, "charge voltage" is the voltage measured between the cathode and the anode when a rechargeable cell is charged.

In one embodiment, electrode "potential" is measured between the electrode and a reference electrode.

In one embodiment, oxidation and reduction processes that occur on electrodes of this invention in electrochemical cells of the present invention comprise the following processes:

In one embodiment, during discharge, on the cathode, oxygen is reduced to hydroxide ions according to the following reaction: $O_2 + 2H_2O + 4 \rightarrow 4OH^-$.

In one embodiment, during discharge, oxidized silver (II) is reduced to oxidized silver (I) according to the following reaction: $2AgO + H_2O + 2e \rightarrow Ag_2O + 2OH^-$.

In one embodiment, during discharge, oxidized silver (I) is reduced to silver according to the following reactions: $Ag_2O + H_2O + 2e \rightarrow 2Ag + 2OH^-$.

In one embodiment, during charging, hydroxide ions are oxidized to form oxygen and water according to the following reaction: $4OH^- \rightarrow O_2 + 2H_2O + 4e$.

In one embodiment, during charging, oxidized silver (I) is oxidized to silver (II) according to the following reaction: $Ag_2O+2OH^-\rightarrow 2AgO+H_2O+2e$.

In one embodiment, during charging, silver is oxidized to silver (I) according to the following reaction: $2Ag+2OH^-\rightarrow Ag_2O+H_2O+2e$.

In one embodiment, the processes mentioned herein above occur sequentially. In one embodiment the processes shown herein above occur in parallel.

In one embodiment, "charge mode" means the mode in which the rechargeable cell is being charged.

In one embodiment, "discharge mode" is the mode wherein the cell is connected to a load. At discharge mode, current may flow through a wire or through any load or device that is connected on one side to the anode and on the other side to the cathode. At this mode, a voltage can be measured that reflects the electrochemical processes occurring simultaneously on the cathode and on the anode. At discharge mode the cell is used to power a device (e.g. the cell is connected to a load).

In one embodiment, a "current collector" is a conducting material that is in contact with the catalyst and/or is part of the electrode. The current collector is used to pass current from the cathode (i.e. the Ag catalyst), through the current collector wire to the anode and/or to pass electrons from the anode to the cathode through a load in a discharge mode. During charging, the current collector passes current to the catalyst for charging.

In one embodiment, the active layer is the electrode layer comprising the active mix and the current collector.

In one embodiment, "active mix" is a mix of the catalyst (e.g. a cluster of silver particles comprising the $ZrO_2$ particles) and a water repellant polymer.

In one embodiment, the "hydrophobic polymer gas diffusion layer" is permeable to gas (e.g. air) but is not permeable to water or to an alkaline solution that is present within the electrochemical cell. In one embodiment, the hydrophobic polymer gas diffusion layer is also referred to as the "porous hydrophobic film". In one embodiment, the hydrophobic polymer film constitutes the backing of the electrode and the 'wall' of the electrochemical cell. In one embodiment, oxygen can enter the cell through the hydrophobic polymer film but electrolyte solution can not exit the cell through this hydrophobic polymeric film.

In one embodiment, the "water repellant polymer" is a polymer used to organize a three-phase zone further comprising the catalyst. In one embodiment, the water repellant polymer forms a three-phase structure such that it supports the agglomerates/cluster of the silver particles. In one embodiment, the catalyst together with the repellant polymer provides a three-phase zone structure for efficient electrochemical reactions. In one embodiment, the water repellant polymer is in the form of particles (powder). In one embodiment, the water repellant form is in the form of fibers. In one embodiment, the water repellant polymer is also referred to as the polymer binder.

In one embodiment, "active mix" is a mix of catalyst and water repellant polymer.

In one embodiment, a "rechargeable cell" is a secondary cell. In one embodiment, a rechargeable cell can be re-charged after being discharged.

In one embodiment, discharge capacity is the amount of Ah (Ampere-hour) available, expressed in units of ampere-hours (Ah). The capacity of a cell is measured by discharging the cell at a constant current until it reaches its terminal voltage. This is usually done under constant temperature. The capacity of a cell or a cell depends on the quantity of active material in it, the amount of electrolyte and the surface area of the electrodes.

In one embodiment, discharge energy is a measurement of energy that a cell is capable of producing. This measurement is calculated by the product of watts (power) times a time period. Discharge energy is represented in units of watt-hour (Wh).

In one embodiment, charge capacity is represented in units of ampere-hour (Ah) and is the product of current and time. In one embodiment, charge energy is represented in units of Watt-hour (Wh). In one embodiment, Wh is $I*V*t$, wherein I is the current, V is the voltage and t is the time.

In one embodiment, a "battery" is synonymous with a "cell". In one embodiment, a "battery" comprises more than one cell. In one embodiment, a battery comprises at least two "cells". In one embodiment, a battery is formed by connecting certain number of single cells in series or in parallel. In one embodiment, capacity and energy values associated with a battery are a function of the number of cells forming the battery. In one embodiment, capacity and energy values associated with the battery are a function of the configuration of the cells in the battery.

In one embodiment, "size" of a partially-symmetric or non symmetric object is defined as a dimension describing the object. In one embodiment, the size as described herein for a non-symmetrical object is a length that corresponds to the largest dimension of the object, the smallest dimension of the object, an average dimension of the object or any other dimension that can be measured for the object ranging between the largest and the smallest dimensions of the object. In one embodiment, if the longest length value measured for an object is 11 µm, the object "size" may be considered as 11 µm. In one embodiment, if the longest length value measured for an object is 11 µm, the object "size" may be considered as less than 11 µm. In one embodiment, size refers to any value associated with the dimensions of the object such as length, width, height, diameter, perimeter, area, volume etc.

Dimensions and Values

In one embodiment, the zirconium oxide content in the silver/$ZrO_2$ material ranges between 0.2-10% w/w. In another embodiment, the zirconium oxide content in the silver/$ZrO_2$ material is between 0.2-2% w/w. In another embodiment, the zirconium oxide content in the silver/$ZrO_2$ material is between 0.2-5 w/w. In another embodiment, the zirconium oxide content in the silver/$ZrO_2$ material is between 5-10 w/w. In another embodiment, the zirconium oxide content in the silver/$ZrO_2$ material is between 2-5 w/w. In one embodiment, the concentration of the crystalline particles of zirconium oxide in the catalyst is between 1% and 6%, by weight. In one embodiment, the concentration of the crystalline particles of zirconium oxide in the catalyst is between 2% and 4%, by weight. In one embodiment, the zirconium oxide content in the catalyst porous cluster can range between 1% to 6% by weight, and preferably between 2% to 4%.

In one embodiment, the catalyst, electrode or cells or batteries of this invention comprise a cluster comprising primary particles and secondary zirconium oxide particles. In another embodiment, the zirconium oxide particle size is between 2-30 nm. In one embodiment, the crystalline particles of $ZrO_2$ have an average particle size of less than about 50 nanometers. In one embodiment, the crystalline particles of $ZrO_2$ have an average particle size of less than about 20 nanometers. In one embodiment, the crystalline particles of $ZrO_2$ have an average particle size of less than about 10 nanometers. In one embodiment, the crystalline particles of ZrO$_2$ have an average particle size of less than about 6 nanometers. In one embodiment, the crystalline particles of ZrO$_2$ have an average particle size of about 2 to 5 nanometers. In one embodiment, the crystalline particles of ZrO$_2$ have an average particle size of between about 1 to 10 nanometers. In one embodiment, the crystalline particles of ZrO$_2$ have an average particle size of between about 2 to 10 nanometers. In one embodiment, the crystalline particles of ZrO$_2$ have an average particle size of between about 1 to 50 nanometers. In one embodiment, the crystalline particles of ZrO$_2$ have an average particle size of between about 2 to 30 nanometers. In one embodiment, the crystalline particles of ZrO$_2$ have an average particle size of between about 1 to 30 nanometers. In one embodiment, the crystalline particles of ZrO$_2$ have an average particle size of between about 1 to 20 nanometers. In one embodiment, the crystalline particles of ZrO$_2$ have an average particle size of between about 2 to 20 nanometers.

In one embodiment, the clusters of silver particles have an average size in the range of 1 to 50 microns. In one embodiment, the clusters of silver particles have an average size in the range of 3 to 25 microns. In one embodiment, the clusters of silver particles have an average size in the range of 1 to 10 microns. In one embodiment, the clusters of silver particles have an average size in the range of 1 to 20 microns. In one embodiment, the clusters of silver particles have an average size in the range of 1 to 30 microns. In one embodiment, this feature is measured according to scanning electron microscope images (FIG. 1) and also by laser diffraction particle size analysis by Coulter Counter® particle size analysis. Coulter Counter is a registered trademark of Beckman Coulter, Inc. In one embodiment, the cluster is an agglomerate.

In one embodiment, the catalyst, electrode or cells or batteries of this invention comprise a cluster comprising primary particles and secondary zirconium oxide particles. In one embodiment, the primary particles have an average particle size of up to 100 nanometers. In one embodiment, the primary particles have an average particle size of up to 150 nanometers. In one embodiment, the primary particles have an average particle size of up to 60 nanometers. In one embodiment, the size of the primary particles is in the range of 20 to 100 nanometers, and preferably between 40 and 60 nanometers. In one embodiment, the primary particles have an average particle size ranging between 10 to 80 nanometers. In one embodiment, the primary particles have an average particle size ranging between 50 to 150 nanometers. In one embodiment, the primary particles have an average particle size ranging between 100 to 200 nanometers. In one embodiment, the primary particles have an average particle size ranging between 75 to 125 nanometers. In one embodiment, the primary particles are silver particles. This feature is measured according to scanning electron microscope images (FIG. 1) and also by laser diffraction particle size analysis by Coulter Counter® model SA3100 (Beckman Coulter, Inc.) particle size analysis.

In one embodiment, the pores in the porous clusters have an average characteristic dimension of 15 to 250 nanometers. In one embodiment, the pores in the porous clusters have an average characteristic dimension of 50 to 80 nanometers. In one embodiment, the pores in the porous clusters have an average characteristic dimension of 15 to 100 nanometers. In one embodiment, the pores in the porous clusters have an average characteristic dimension of 15 to 80 nanometers. In one embodiment, the pores in the porous clusters have an average characteristic dimension of 10 to 100 nanometers. In one embodiment, where the pore shape is not symmetric, the characteristic dimension of the pore refers to the largest dimension of the pore. In one embodiment, pore dimension is the pore diameter. In a preferred embodiment the average pore size is about 65 nanometers.

In one embodiment, the B.E.T. (Brunauer-Emmett-Teller) specific surface area of the catalyst is in a range of 3 to 16 square meters per gram. In one embodiment, the B.E.T. specific surface area of the catalyst is in a range of 6 to 10 square meters per gram.

In one embodiment, the average total agglomerate porosity of the catalyst is in the range of 30% to 50%. In one embodiment, the average agglomerate porosity of the catalyst is in the range of 35% to 45%. In one embodiment, the porosity is determined by methods known to any person skilled in the art.

In one embodiment, percent of total porosity is the measurement of the density of the porous cluster relative to the density of the non-porous material. For example, the density of non-porous silver is 10.49 g/ml. If the density of a porous silver cluster is 10.49/2=5.245 g/ml, the porosity of the cluster is 50%.

In one embodiment, the tap density of the catalyst as described herein is in the range of 0.8 to 3 g/cc. In one embodiment, the tap density of the catalyst as described herein is in the range of 1.5 to 2.5 g/cc. In one embodiment, the tap density is in units of grams per cubic centimeter.

The maximum purity of the silver/ZrO$_2$ catalyst, i.e. the silver and zirconium oxide together, is at least 99.7% by weight.

In one embodiment, the purity of the silver in the catalyst is above 99% by weight, and preferably in the range of 99.6% to 99.95%.

In one embodiment, the concentration of the primary particles and the secondary crystalline particles of zirconium oxide in the catalyst exceed 99% by weight. In one embodiment, the concentration of the primary particles and the secondary crystalline particles of zirconium oxide in the catalyst exceeds 99.6% by weight. In one embodiment, the concentration of the primary particles and the crystalline secondary particles of zirconium oxide in the catalyst is in the range of 99.6% to 99.95%, by weight.

In one embodiment, this invention provides an active catalyst mix, the mix including the catalyst substantially as described herein, and a water-repellant polymer.

In one embodiment, the water-repellant polymer is present in a concentration in a range of 5% to 20%, by weight. In one embodiment, the water-repellant polymer is present in a concentration in a range of 12% to 18%, by weight.

In one embodiment, the catalyst mix or active-mix of this invention comprises a water repellant polymer. In one embodiment, the water repellant polymer includes a polymer powder having an average particle size of less than 5 microns.

In one embodiment, the water repellant polymer includes a polytetrafluoroethylene powder (i.e. polytetrafluoroethylene particles) having an average size of less than about 5 microns. In one embodiment, the polytetrafluoroethylene particles have an average size of less than about 3 microns. In one embodiment, the polytetrafluoroethylene particles have an average size ranging between 1 micron and 5 microns. In one embodiment, the polytetrafluoroethylene particles have an average size ranging between 2 micron and 10 microns. In one embodiment, the polytetrafluoroethylene particles have an average size ranging between 1.5 and 4.5 microns. In one embodiment, the polytetrafluoroethylene particles have an average size ranging between 1 micron and 7 microns. In one embodiment, "size" means diameter for a round-shaped particle. In one embodiment, size means one of the dimensions describing the particles such as the largest or the average surface point to surface point or surface corner to surface corner dimension of the particle.

In one embodiment, the thickness of the hydrophobic gas-diffusion layer (the hydrophobic polymer film) is in a range of 25 to 300 microns. In another embodiment, the thickness of the hydrophobic layer is in a range of 25 to 100 microns. In another embodiment, the thickness of the hydrophobic layer is in a range of 50 to 150 microns. In another embodiment, the thickness of the hydrophobic layer is in a range of 100 to 200 microns. In another embodiment, the thickness of the hydrophobic layer is in a range of 250 to 500 microns. In another embodiment, the thickness of the hydrophobic layer is in a range of 50 to 600 microns.

In one embodiment, the thickness of the layer comprising the active mix and the current collector ranges between 100 µm and 600 µm. In one embodiment, the thickness of the layer comprising the active mix and the current collector ranges between 75 µm and 500 µm. In one embodiment, the thickness of the layer comprising the active mix and the current collector ranges between 300 µm and 400 µm. In one embodiment, the thickness of the layer comprising the active mix and the current collector ranges between 100 µm and 200 µm. In one embodiment, the thickness of the layer comprising the active mix and the current collector ranges between 300 µm and 500 µm.

In one embodiment, loading of the active mix is the amount in grams of active mix that is present on a certain area. In one embodiment, loading is described in units of mg/cm². In one embodiment, the loading of the active catalyst mix is in a range of 5 to 100 mg/cm². In one embodiment, the loading of the active catalyst mix is in a range of 20 to 120 mg/cm². In one embodiment, the loading of the active catalyst mix is in a range of 20 to 100 mg/cm². In one embodiment, the loading of the active catalyst mix is in a range of 40 to 100 mg/cm². In one embodiment, the loading of the active catalyst mix is in a range of 40 to 90 mg/cm². In one embodiment, the loading of the active catalyst mix is in a range of 50 to 80 mg/cm². In one embodiment, the loading of the active catalyst mix is in a range of 50 to 70 mg/cm². In one embodiment, the loading of the active catalyst mix is less than 80 mg/cm². In one embodiment, the loading of the active catalyst mix is less than 60 mg/cm². In one embodiment, the loading of the active catalyst mix is less than 40 mg/cm².

In one embodiment, the electrode is produced by a method that includes compacting and sintering.

In one embodiment of this invention such electrodes can be made with a carbon powder support for the inventive catalyst or for the inventive catalyst mix. In a preferred embodiment of this invention the alkaline electrolyte air/oxygen cathode can be made without a carbon powder support for the inventive catalyst or for the inventive catalyst mix.

In one embodiment, the composition and structure of the inventive catalyst permits the production of carbon-less air cathodes. These inventive electrodes in their various embodiments can be used in various applications, including but not limited to alkaline electrolyte electrochemical cells such as but not limited to alkaline fuel cells, metal hydride anode alkaline fuel cells, metal-air rechargeable cells or batteries, metal-air non-rechargeable cells or batteries, oxygen sensors, and electrolysis cells, such as but not limited to chlor-alkali cells.

Such electrodes made with the inventive silver catalyst and silver catalyst mix have advantages over state of the art silver-catalyzed electrodes including longer life time, more robust structure and much higher stability porous structure and maintenance of the surface area at the open circuit voltage (OCV) and also much improved capability to operate in the bi-functional mode in alkaline electrolytes. In one embodiment, bi-functional mode, means the ability to perform in both oxidative and reductive modes. In cell terminology, bi-functional mode capability manifests itself in both the charging and discharging of the cell.

In one embodiment, tri-functional mode in this context comprises in addition to the bifunctional mode described herein above, the ability to gain more energy from an electrochemical process on the electrode during charge mode and to use this additional energy in a subsequent discharge mode. In one embodiment, during charge mode, the silver on the electrode is being oxidized to $Ag_2O$, and/or to AgO. Upon the following discharge mode, the silver oxide species are being reduced back to silver, thus adding available energy to the electrochemical cell. According to this aspect and in one embodiment, the trifunctional mode of electrode operation includes: i) reduction of oxygen and formation of hydroxide ions (discharge operation); ii) conversion of hydroxide ions back to oxygen (charge operation); and iii) oxidation of electrode material during charge operation such that the electrode provides additional energy at the following discharge cycle when the electrode's oxidized material is reduced back to its non oxidized form.

In one embodiment, the third function of the electrode as described herein above can be explained with reference to FIG. 9, where a charging plot of voltage vs. time is shown. As charging begins, silver is oxidized to silver (I) oxide at a voltage of ~2.2 V. This process is followed by the oxidation of silver (I) oxide to silver (II) oxide at a voltage of ~2.3 V. The oxidation of hydroxide ions to oxygen is not shown in this plot. This oxidation occurs only after the two oxidation processes of silver and of silver (I) had occurred.

Figure 8:
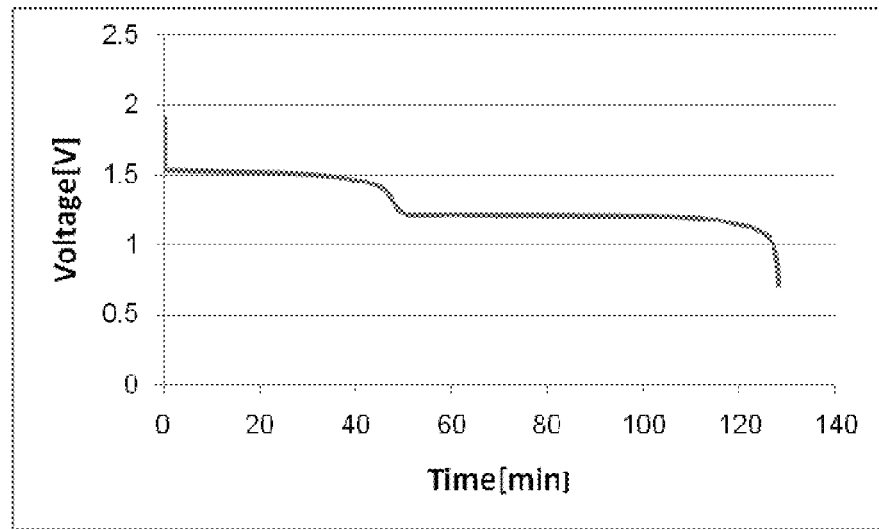
FIG. 8 is a voltage vs. time plot of a rechargeable zinc-air cell comprising electrode of the invention during discharge mode.

In one embodiment, a subsequent discharge plot is shown in FIG. 8. First, reduction of the two species of silver oxides occurs in parallel at a voltage of ~1.5 V. This reduction of silver oxides to silver is followed by the reduction of oxygen ($O_2$) to hydroxide ions ($OH^-$) at a voltage of ~1.25 V. The first discharge voltage (~1.5 V) representing the silver oxide reduction processes is the source of the additional energy that is extracted from electrodes of this invention when in use in discharge mode in electrochemical cells.

In one embodiment, the voltages of a rechargeable cell comprising an electrode of this invention depend on the current density. In one embodiment, the two discharge voltages of a cell comprising an electrode of this invention range between 1.2-1.6 V and between 1.1 V-1.3 V respectively. In one embodiment, the two discharge voltages of a cell comprising an electrode of this invention range between 1.1 V and 1.6 V. In one embodiment, the two discharge voltages of a cell comprising an electrode of this invention range between 0.5 V and 1.5 V. In one embodiment, the two discharge voltages of a cell comprising an electrode of this invention range between 0.1 V and 0.5 V. In one embodiment, the two discharge voltages of a cell comprising an electrode of this invention range between 1 V and 1.3 V. In one embodiment, the two discharge voltages of a cell comprising an electrode of this invention range between 1.0 V and 1.5 V. In one embodiment, the two discharge voltages of a cell comprising an electrode of this invention range between 0.75 V and 1.25 V. In one embodiment, the two discharge voltages of a cell comprising an electrode of this invention range between 0.01 V and 0.25 V. In one embodiment, the two discharge voltages of a cell comprising an electrode of this invention range between 1.0 V and 2.0 V. In one embodiment, the two discharge voltages of a cell comprising an electrode of this invention range between 1.15 V and 1.35 V.

In one embodiment, the discharge voltage depends on the current density. In one embodiment, the voltage is a function of the current density and the current density is a function of the load. In one embodiment, the cell can be designed such that the discharge voltages fit a specific application. In one embodiment, at least two cells of this invention can be connected in series or in parallel to yield higher voltage/current. In one embodiment, 10 cells are connected in series.

In one embodiment, this invention provides metal-air electrically rechargeable batteries or cells. In one embodiment, electrode of the rechargeable cell of this invention may be tri-functional, providing the following three functions:
1) catalytic reduction of oxygen and formation of hydroxide ions when providing electrical current (discharge mode of operation);
2) conversion of the hydroxide ions back into oxygen when current is supplied to it (charge mode of operation).
3) oxidation of silver to various silver oxide species in a charge mode of operation, such that in a subsequent discharge mode, the electrode supplies additional energy.

In one embodiment, oxidation of silver to various silver oxide species in a charge mode of operation, results in additional energy that can be used in a subsequent discharge mode. In one embodiment, this additional energy is supplied by the cell comprising the electrode in a subsequent discharge mode. In one embodiment, in a subsequent discharge mode, the oxidized silver species are being reduced to other silver oxides and/or to silver, and these reduction processes yield additional energy. This energy is in addition to the energy supplied by the catalytic reduction of oxygen.

In one embodiment, this additional energy can be calculated from FIG. 8. FIG. 8 is a plot of voltage vs. time for a cell of this invention operated in a discharge mode. The total energy in Wh can be calculated as the time (hours) multiplied by the current (Ampere) and further multiplied by the voltage (V). From this plot it can be seen that the area corresponding to the additional energy supplied by reduction of oxidized silver species is the area between 0 min and approximately 50 min. On the Voltage axis, this area ranges between 1.2 V and 1.45 V. Accordingly, the energy corresponding to this area is 5/6 h*2 A*0.25 V=0.42 Wh. The energy supplied by the cell as a result of oxygen reduction according to this plot is: 130/60 h*2 A*1.2 V=5.21 Wh. Therefore, the additional energy supplied by the reduction of oxidized silver species amounts to (0.42/5.21)*100=8.1%.

In one embodiment, the additional energy ranges between 8% and 10%. In one embodiment, the additional energy ranges between 5% and 15%. In one embodiment, the additional energy ranges between 1% and 10%. In one embodiment, the additional energy ranges between 1% and 5%. In one embodiment, the additional energy ranges between 10% and 20%. In one embodiment, the additional energy ranges between 1% and 50%. In one embodiment, the additional energy ranges between 7.5% and 12.5%. In one embodiment, the additional energy ranges between 1% and 80%. In one embodiment, the additional energy ranges between 5% and 20%. In one embodiment, the additional energy ranges between 10% and 40%. In one embodiment, the additional energy ranges between 1% and 99%. In one embodiment, the additional energy is described in percent of the energy supplied by another process such as the reduction of oxygen. In one embodiment, the additional energy described herein above is in addition to the energy supplied by a different process e.g. the process of oxygen reduction.

In one embodiment, electrically rechargeable metal-air cells or batteries of this invention may have a very wide range of charge/discharge capacity and energy.

In one embodiment, the capacity of electrically rechargeable metal-air cells of this invention ranges between from 0.1 to 5000 Ah. In one embodiment, the capacity of electrically rechargeable metal-air cells of this invention ranges between from 1.0 to 500 Ah. In one embodiment, the capacity of electrically rechargeable metal-air cells of this invention ranges between from 3.0 to 15.0 Ah. In one embodiment, the capacity of electrically rechargeable metal-air cells of this invention ranges between from 0.1 to 25.0 Ah. In one embodiment, the capacity of electrically rechargeable metal-air cells of this invention ranges between from 2.0 to 6.0 Ah. In one embodiment, the capacity of electrically rechargeable metal-air cells of this invention ranges between from 0.1 to 1.0 Ah. In one embodiment, the capacity of electrically rechargeable metal-air cells of this invention is greater than 0.1 Ah. In one embodiment, the capacity of electrically rechargeable metal-air cells of this invention is smaller than 5000 Ah. In one embodiment, the capacity of electrically rechargeable metal-air cells of this invention ranges between 4.0 and 5.5 Ah. In one embodiment, the capacity of electrically rechargeable metal-air cells or batteries of this invention ranges is 4.2±0.5 Ah. In one embodiment, the capacity of electrically rechargeable metal-air cells or batteries of this invention is 5.0±0.5 Ah.

In one embodiment, the capacity ranges/values disclosed herein above are the capacity values for discharge capacity, for charge capacity or for a combination thereof.

In one embodiment, the energy of electrically rechargeable metal-air cells of this invention ranges between from 0.1 to 7000 Wh. In one embodiment, the energy of electrically rechargeable metal-air cells of this invention ranges between from 0.1 to 700 Wh. In one embodiment, the energy of electrically rechargeable metal-air cells of this invention ranges between from 1.0 to 10.0 Wh. In one embodiment, the energy of electrically rechargeable metal-air cells of this invention ranges between from 5.0 to 15.0 Wh. In one embodiment, the energy of electrically rechargeable metal-air cells of this invention ranges between from 7.5 to 12.5 Wh. In one embodiment, the energy of electrically rechargeable metal-air cells of this invention ranges between from 15.0 to 20.00 Wh. In one embodiment, the energy of electrically rechargeable metal-air cells of this invention is greater than 0.1 Wh. In one embodiment, the energy of electrically rechargeable metal-air cells of this invention ranges is smaller than 20.0 Wh. In one embodiment, the energy of electrically rechargeable metal-air cells of this ranges between 0.1 to 5.0 Wh. In one embodiment, the energy of electrically rechargeable metal-air cells of this invention is 5.5±0.5 Wh. In one embodiment, the energy of electrically rechargeable metal-air cells of this invention is 11.0±0.5 Wh.

In one embodiment, the energy ranges/values disclosed herein above are the energy values for discharge energy, for charge energy or for a combination thereof.

In the inventive cathode applications referenced herein, the alkaline fuel cells are of a type that includes those that use anode fuels from a group that includes but is not limited to hydrogen, ethanol, methanol, aqueous solutions of ethanol, and aqueous solutions of methanol. The source of hydrogen may be directly from hydrogen gas or hydrogen reformed from methanol, or other sources such as but not limited to ethanol.

These alkaline fuel cells can be either of a type that use filters to filter out carbon dioxide from the air used for the cathode fuel or of a type that do not use filters to filter out carbon dioxide from the air used for the cathode fuel. In other words, the inventive air cathode can work directly in air containing carbon dioxide.

The alkaline electrolyte chosen for the electrochemical cell applications of this invention includes a metal hydroxide that is chosen from the group that includes but is not limited to potassium hydroxide, sodium hydroxide, magnesium hydroxide, aluminum hydroxide, lithium hydroxide, and mixtures thereof. The concentration of the electrolyte can range from sub-molar to saturation.

In one embodiment of this invention the electrolysis cell is a chlor-alkali cell that uses oxygen depolarized cathodes.

Clean, sustainable energy is a global concern. Air cathodes are at the very heart of some of today's most advanced power sources, namely high energy metal-air cells or batteries and alkaline fuel cells. These power sources are used for back-up power, portable and emergency uses, electric vehicles, biomedical devices like hearing aids and cochlear implants, portable telecommunication devices for military and civilian use, portable electronic devices, pilot-less drones, and in the space program, to name just a few of their applications Alkaline fuel cells are one of the most developed types of fuel cells. They have been used since the mid-1960s by NASA in the Apollo and Space Shuttle programs. The function of air cathodes in these power sources is to convert oxygen into electricity as the cathodic portion of the electrochemical coupled reaction. But in spite of their critical role they remain one of the most costly components, about a quarter of the cell cost in some cases due to use of platinum or other precious metal catalysts, and also a major limiting factor in cell performance. Thus there is an important need to improve the quality of air cathodes and lower their cost.

The air cathode of the present invention may allow electrochemical cells, such as batteries and fuel cells, to last longer and significantly cuts their costs. Commercial air cathodes are made with carbon powder that acts as a support for the catalyst. But since the carbon can deteriorate during normal use the life of the cell is usually shortened. The inventive silver catalyst allows the production of carbon-less air cathodes thereby making the cathode much more robust for extended life, easier manufacturing, and better durability. The inventive catalyst also provides much higher power than non-precious metal catalysts like those based on manganese, cobalt, nickel, or combinations thereof, but at much lower cost than platinum. The inventive carbon-less silver based catalyst electrode can be used as a direct 'drop-in' replacement for conventional air cathodes in alkaline fuel cells and metal-air cells or batteries to reduce cost and improve performance. One of the factors limiting the commercialization of rechargeable metal-air cells or batteries is the presence of carbon in the cathode, which tends to oxidize and degrade during charging. Thus, the inventive carbon-less cathode also enables development of rechargeable metal-air cells that are not otherwise viable.

According to the present invention, there is provided a method of producing porous clusters of silver particles promoted by $ZrO_2$ [zirconium oxide (IV)], the method including:

1. providing a silver powder having a porous agglomerate structure and a silver particle size in the range of up to 100-150 nanometers, and more preferably, up to 100 nanometers;
2. impregnation of the silver agglomerate by a water solution that includes zirconium (IV) dinitrate oxide hydrate $[ZrO(NO_3)_2.xH_2O]$ or zirconium (IV) dichloride oxide hydrate $ZrOCl_2.xH_2O$; this treatment lasts for at least 30 minutes;
3. treatment of this suspension by an alkaline aqueous solution, preferably under intensive stirring, to precipitate zirconium hydroxide in the pores of the agglomerate;
4. rinsing the suspension to about neutral pH of between 6-8 in order to remove the alkaline aqueous solution from the pores and then drying to produce a residual material;
5. heat treatment of the dried suspension, preferably at 250-300° C. for 10-60 minutes to dehydrate the zirconium hydroxide and then subsequently at 400-550° C. for an additional 10-30 minutes to produce zirconium oxide crystals;
6. separating off coarse material having a particle size of above 40 to above 250 microns, typically by sieving.

The alkaline water solution is preferably either sodium hydroxide or potassium hydroxide, or mixtures thereof, at a concentration by weight of between 5% to 40%, by weight.

Mechanism of Action and Product Structure

The impregnation of the silver porous agglomerate by a water solution containing zirconium (IV) dinitrate oxide hydrate or zirconium (IV) dichloride oxide hydrate—$ZrOCl_2.xH_2O$, followed by alkaline water solution treatment, preferably under intensive stirring, results in precipitation of zirconium hydroxide into the pores of the agglomerate. After washing the suspension, drying, and heating, preferably at 250-300 degrees Celsius, dehydrated particles of $Zr(OH)_4$ deposit into the pores of silver agglomerates on the surface of primary particles. At 400-550 degrees Celsius, final formation of monoclinic or of orthorhombic crystals of $ZrO_2$ occurs. These crystals have full corrosion stability in strong alkaline solution within all the range of the air electrode's working potentials, including the bi-functional mode of operation. The size of the zirconium oxide crystals of the present invention is less than 50 nanometers, preferably less than 20 nanometers and most preferably is about 3-5 nanometers. The zirconium oxide crystals prevent intensive surface diffusion and roughening of the silver agglomerate's porous structure, which the bulk alloys of silver can not do.

The catalyst of this invention includes a porous cluster of silver particles in contact with smaller zirconium oxide particles. Crystalline particles of $ZrO_2$ are located in the pores of the silver agglomerate on the surface of the silver particles.

Figure 2:
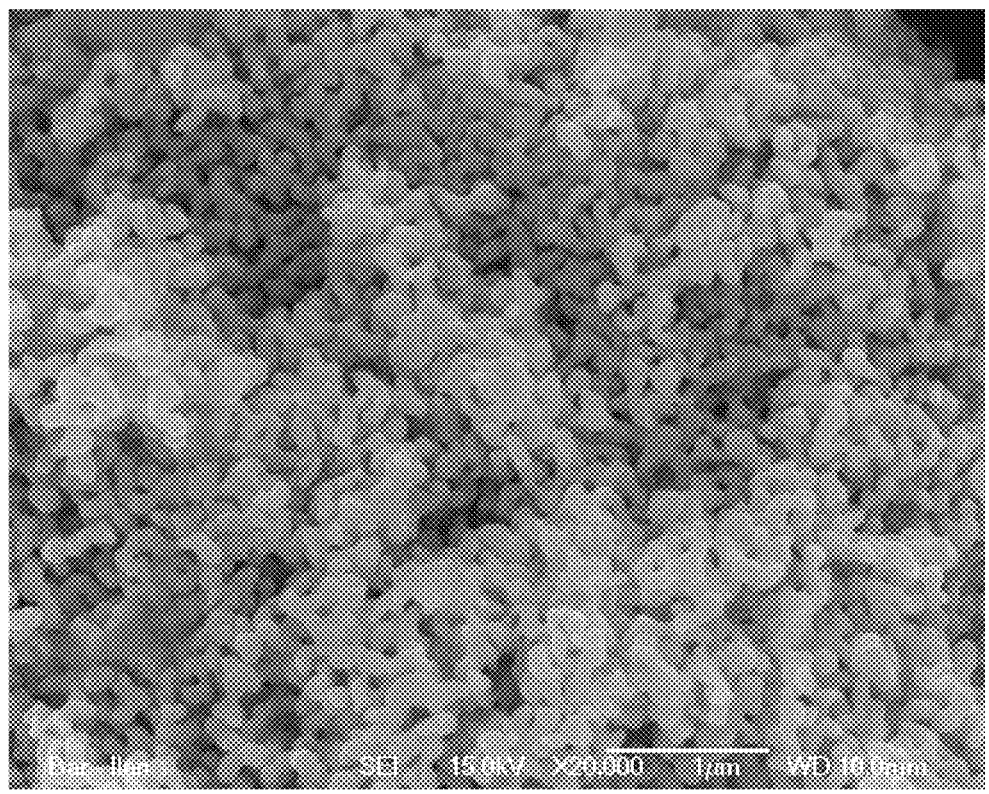
FIG. 2 is high resolution scanning electron microscope (HRSEM) image showing the porous structure of silver clusters comprising silver particles and $ZrO_2$ particles ($ZrO_2$ particles are too small to resolve)

In one embodiment, a porous cluster of a plurality of nanometric silver particles is formed as depicted in FIG. 2. The aggregation of silver particles is such that a plurality of pores or porous cavities is formed from the collective surfaces of nanometric silver particles.

Figure 3:
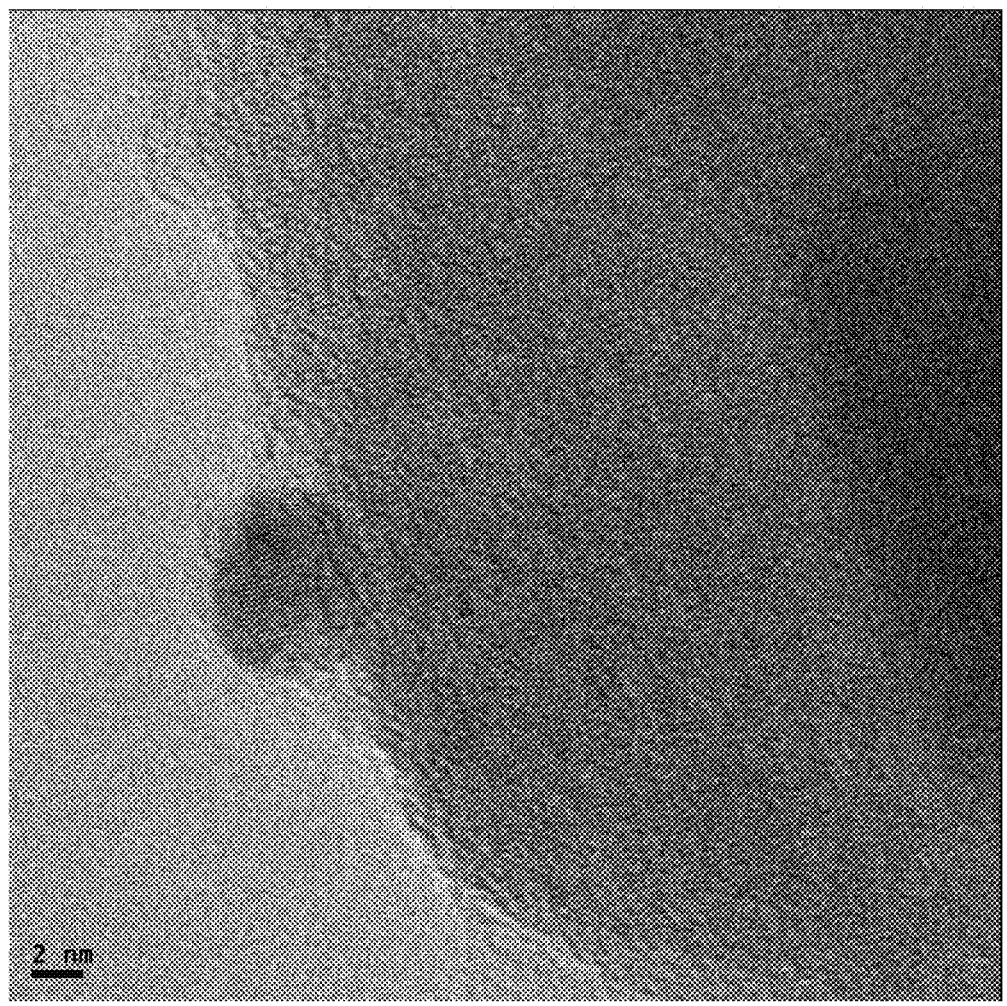
FIG. 3 is a high resolution transmission electron microscope (HRTEM) image showing a $ZrO_2$ particle on the surface of a primary silver particle.

In one embodiment, a porous cluster of nanometric silver particles comprises a plurality of nanometric zirconium oxide crystals which are deposited on a surface of the nanometric silver particles. Zirconium oxide crystals such as the crystal shown in FIG. 3 are also deposited in pores or porous cavities such as pore or porous cavity of the silver cluster shown in FIGS. 1 and 2; the pores are made up of a plurality of surfaces of nanometric silver particles. The resultant structure is a porous cluster of silver particles wherein zirconium oxide particles are attached to silver particles. In one embodiment, the silver particles are only partially-covered by the $ZrO_2$ particles.

The nanometric zirconium oxide crystals may be deposited in a manner so as to produce a continuous or semi-continuous nanolayer on the surface of the silver clusters and on the surface of pores or porous cavities of the silver cluster. In one embodiment, the zirconium oxide crystals do not form a continuous layer, but rather are deposited in some regions, while leaving neighboring regions uncovered. In one embodiment, the $ZrO_2$ crystal deposition described herein above is not limited to deposition on silver clusters but is also applicable to any porous cluster or agglomerate of metal, metal oxide or metal alloy or to any other compound which comprises metal. In one embodiment, the addition of $ZrO_2$ particles to the silver cluster renders the silver cluster more stable. In one embodiment, the silver cluster stability is reflected in cluster's ability to withstand electrochemical reactions. In one embodiment, the crystal is compatible with electrolyte solutions and with repeated discharge/charge cycles when the cluster is used as part of an electrode in an electrochemical cell.

Applications of the $Ag/ZrO_2$ Cluster to Air/Oxygen Electrodes a. Manufacturing the Electrode The air electrode, consisting of an active mix of the inventive silver catalyst, current collector and a hydrophobic porous film (such as polytetrafluoroethylene (PTFE)) bonded thereto, can be produced by compacting and sintering.

In one embodiment, this invention provides a method of producing a tri-functional electrode comprising:
   a porous cluster of silver particles;
   crystalline particles of $ZrO_2$;
   wherein said $ZrO_2$ particles reside on the surface of the silver particles and wherein said electrode performs three functions:
      a. the electrode functions as a catalyst for the reduction of oxygen ($O_2$) to hydroxide ($OH^-$) ions when said electrode is used as a cathode in a discharge mode;
      b. the electrode functions as a catalyst for the oxidation of hydroxide (OH) ions into oxygen ($O_2$) in a charge mode;
      c. the electrode is oxidized in the charge mode such that in a subsequent discharge mode, said electrode provides additional energy;
      said method comprising:
         1. manufacturing an active mix by mechanical dry or wet mixing of:
            i. a porous cluster of silver particles comprising crystalline particles of $ZrO_2$
            ii. a water repellant polymer;
         2. spreading the active mix by wet screen printing or by mechanical dry leveling;
         3. compacting in one step by pressing or rolling
            (i) said active mix,
            (ii) a current collector and
            (iii) a porous hydrophobic polymer film;
         4. sintering the compacted electrode at elevated temperature.

In another embodiment the porous cluster of silver particles comprising crystalline particles of $ZrO_2$ is made by:
   a. providing a porous cluster of silver particles;
   b. impregnating said clusters of silver particles by contacting said particles with an aqueous solution comprising a Zr(IV) salt to form a suspension;
   c. contacting said suspension with an aqueous alkaline solution to produce zirconium hydroxide which precipitates in pores of said porous clusters;
   d. rinsing and drying said cluster with said zirconium hydroxide precipitated in said pores to produce a dried residual material; and
   e. heating said dried residual material to effect dehydration and subsequently heating to produce crystals of zirconium oxide, thereby forming the nano-size silver cluster comprising particles of zirconium oxide.

In one embodiment, the cathode, described hereinabove with regard to FIG. 2, includes inventive active mix C, at least one current collector B, and a hydrophobic layer A. A broad face of hydrophobic layer A covers both active mix C and current collector B. It is further evident from FIG. 2 that active mix C and current collector B are disposed on a single side of the broad face of hydrophobic layer A.

In practice, the active mix includes the inventive porous clusters of silver particles and a water repellant material in powder or fibrous form. In particular, the water repellant polymers include but are not limited to paraffin, and hydrophobic polymers. Such hydrophobic polymers include fluorinated polymers. Such fluorinated polymers include but are not limited to polytetrafluoroethylene, fluorinated ethylene-propylene, perfluoroalkoxy polymer resin chlorotrifluoroethylenes, and polyvinylidene fluorides.

By weight, the percent of the water repellant powder in the catalyst mix should be between 5-20%, more preferably between 12-18%, and in the preferred embodiment 16%.

In practice, the inventive air cathode can use a variety of materials for the electronically conductive current collector. These include but are not limited to metal screen, metal wire mesh, non-woven metal fiber mat, perforated metal sheet, and stretched (expanded) metal foils. The metals that can be chosen for these current collector forms include nickel, nickel alloys, steel, various types of stainless steel, silver, silver coated nickel, silver coated nickel alloys, silver coated steel, silver coated stainless steel, and others that are suitable for contact with silver in alkaline electrolytes.

The material for the hydrophobic layer includes but is not limited to fluorinated polymers. Such fluorinated polymers include but are not limited to polytetrafluoroethylene, fluorinated ethylene-propylene, perfluoroalkoxy polymer resin, chlorotrifluoroethylenes, and polyvinylidene fluorides. The porosity and the thickness of the hydrophobic layer is chosen so as to optimize the performance of the inventive cathode in its electrochemical cell. Parameters to consider for the optimization include the target rate capability (current output), operating life time, and other items that one skilled in the art is familiar with. For instance a high porosity thin hydrophobic layer permits high currents (that is high rate of oxygen gas diffusion across the layer) but may allow movement of liquid from the electrolyte to the gas side of the cathode and thus drying out of the cell and flooding of the pores and thereby shortening the effective lifetime. In other versions, thin hydrophobic layers may have low porosity, and thick hydrophobic layers may have high porosity. The combined effect of the thickness and porosity can be measured and quantified by the Gurley number. A Gurley number is the time in seconds it takes for 100 cc of air to pass through one-square inch of membrane when a constant pressure of 4.88 inches of water is applied.

The active mix for the air electrode was produced by double sieving of the above-described catalyst through a 75 micron sieve and manually mixing it with PTFE powder of grade Zonyl MP 1200 produced by DuPont®. This PTFE powder has an average particle size of 3 microns. The ratio (by weight) of catalyst to FIFE powder was 84:16. The mixing can be done by wet or by dry mechanical mixing.

In one embodiment, the active mix loading in the experimental electrode was 85 mg/cm$^2$. A woven stainless steel grid of 20 mesh size, having a wire diameter of 0.19 mm and coated by 5-7 microns of silver was used as a current collector and supporting member of the electrode. Alternatively, an expanded metal current collector made from nickel such as 3 Ni 5-077 obtained from Dexmet® was used. Before compacting the grid was subjected to coining (flattening) at a pressure of 250 kg/cm$^2$ PTFE Gas Diffusion Membrane D-type, produced by W. L. Gore & Associates, Inc. was used as a hydrophobic layer. In one embodiment, no Ni mesh was used. In one embodiment, FEP and PFA were used as a water repellant component for the active mix.

All these components were placed into the die of a press-mold and compacted at 110 kg/cm$^2$. The sintering of the electrode was carried out in air at 340° C. for 20 minutes when PTFE was used in the active mix. In another embodiment, the sintering of the electrode was carried out at 310° C. when PFA was used as the polymer binder. In another embodiment, the sintering of the electrode was carried out at 280° C. when FEP was used.

The loading of the active catalyst mix in the air cathode can range from 10 milligrams per square centimeter geometric area up to 250 milligrams per square centimeter of electrode geometric area, and preferably ranges from about 20 milligrams per square centimeter geometric area up to 120 milligrams per square centimeter.

In one embodiment, the term "a" or "one" or "an" refers to at least one. In one embodiment the phrase "two or more" may be of any denomination, which will suit a particular purpose. In one embodiment, "about" or "approximately" or "roughly" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

EXAMPLES

Example 1

Preparation of Clusters of Silver Articles Comprising ZrO$_2$ Particles

Following is an example of a method for producing clusters of nano-sized silver particles comprising ZrO$_2$ particles according to embodiments of the present invention:

A sample of 100 g of the silver powder produced from heat treated strips of 25Ag-75Al alloy (weight percent) and having a primary particle size about 40-50 nanometers, was taken as a precursor material. The specific surface area (SSA) as measured by the B.E.T. method of this powder was 6.7 m$^2$/g. In one embodiment, 10 g of zirconium (IV) dinitrate oxide hydrate was dissolved in 140 ml or in 200 ml of water. In one embodiment, 1 g of zirconium (IV) dinitrate oxide hydrate was dissolved in 140 ml or in 200 ml of water. Silver powder was immersed in this solution and soaked for 1 hour. Afterwards, 30 ml of 25% NaOH was poured into the suspension under intensive stirring, which lasted for a few minutes or up to one hour until the reaction (precipitation of white flakes) was finished. The mix was rinsed to a neutral pH of about 7 to remove the NaOH solution, decanted and dried out.

The heat treatment was carried out according to the following mode: 250° C. for 20-60 minutes for dehydration, followed by 450° C. for 15 minutes to produce zirconium oxide crystals. The final ZrO$_2$ content in the catalyst ranges between 0.55% and 3.8% by weight, and the specific surface area (SSA) of the catalyst was between 4.5 m$^2$/g and 7.5 m$^2$/g. The minimum purity of the silver/ZrO$_2$ material was at least 99.7% by weight.

Example 2

Preparation of a Gas-Diffusion Electrode

The air cathode, consisting of active mix, PTFE porous gas-diffusion film as a hydrophobic layer and current collector was produced by compacting and sintering as follows:

As a catalyst for the active mix, the silver porous clusters alloyed by zirconium oxide as described in example 1 were used. The average size of the clusters was 10-15 micron; the ZrO$_2$ content was 0.55 wt %. Specific surface area of the catalyst was 4.5 m$^2$/g.

As a polymer binder, PTFE powder of grade Zonyl MP 1200 produced by DuPont (average particle size of 3 micron) was used. The ratio (by weight) of silver/ZrO$_2$ catalyst to PTFE powder was 84:16.

Woven nickel grid of 20 mesh size having wire diameter of 0.16 mm was used as a current collector and supporting member of the electrode. Before compacting the grid was coining (flattening) under the pressure of 250-300 kg/cm$^2$.

The active mix was produced by manual mixing for 10-15 min followed by double manual sieving through a 75 micron sieve. The active mix loading was 90 mg/cm$^2$.

Double layer of PTFE gas diffusion membrane B-type, produced by W.L. Gore & Associates, Inc. was used as a hydrophobic gas diffusion layer. The electrode of 85×85 mm was compacted under 120 kg/cm$^2$ and sintered in air at 343° C. for 15 min.

Example 3

Electrochemical Cell and Electrochemical Test of the Electrode

Figure 7:
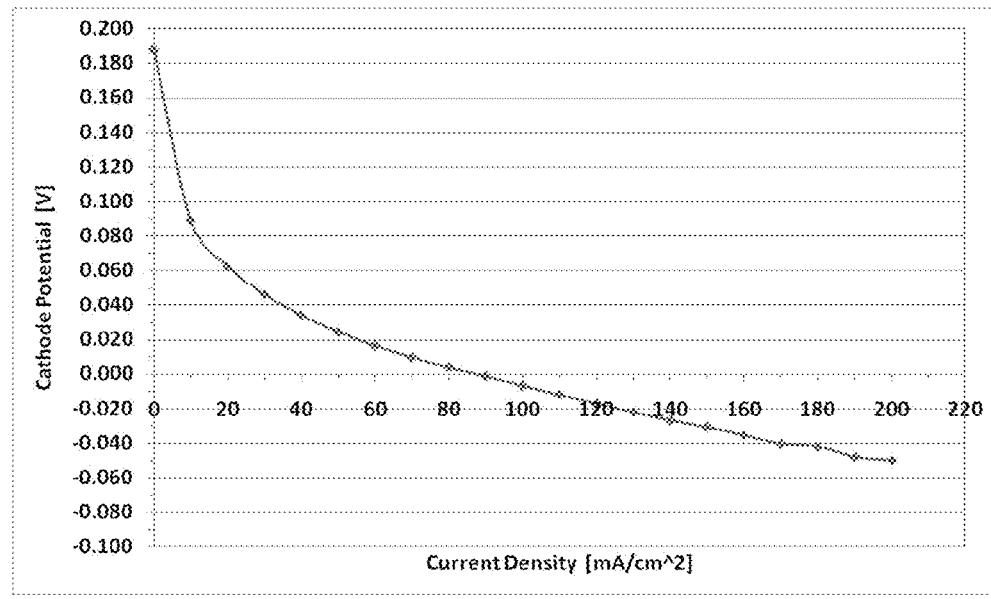
FIG. 7 is a plot of cathode potential vs. current density for an electrode of this invention; measurements were taken at 30° C.

In one embodiment, an electrochemical test of the electrode was conducted as follows: polarization as shown in FIG. 7 refers to the change in voltage of the air cathode (i.e. the silver/ZrO$_2$ electrode) vs. a mercury/mercury oxide reference electrode from its rest (open circuit) value to the value reached where the indicated current density is supported by the electrode. A low polarization (change in voltage) is desired for best performance and the lower the value the better the rate capability (the performance) of the electrode. In the figure, this value is noted as Cathode Potential (V) on the Y-axis.

The primary electrochemical performance of the electrodes was measured in a half cell with a nickel counter electrode in 25% KOH at 24°-26° degrees Celsius. Polarization data for the experimental electrode are shown in FIG. 7. Polarization data were measured vs. Hg/HgO reference electrode.

Data were taken with IR drop correction, i.e. with elimination of the resistance artifact between the reference electrode and the cathode.

Example 4

Electrochemical Measurements of Gas-Diffusion Electrodes

Figure 6:
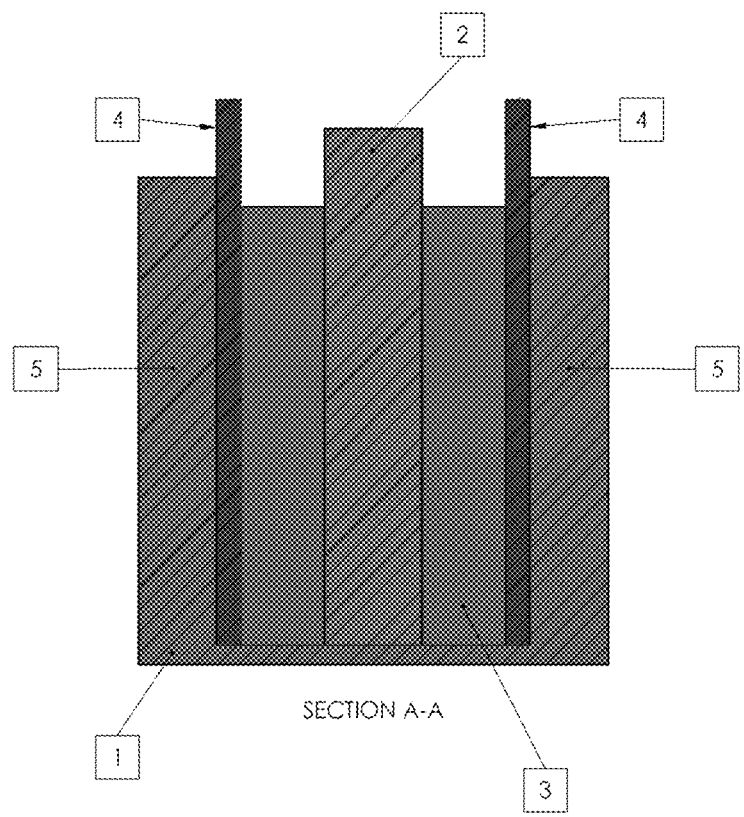
FIG. 6 is a schematic cross-sectional view of an electrochemical air-zinc cell according to the present invention, in which is disposed an air cathode.

FIG. 6 is a schematic cross-sectional view of an electrochemical cell for air-Zn system according to the present invention, in which are disposed two inventive air cathodes 4, an anode 2, an electrolyte 3, all of which are contained within a cell casing 1. The electrochemical cell shown may optionally have two passages 5 for the supply of air or oxygen to air cathodes 4.

Example 5

Electrochemical Test of the Cathode and Possible Mechanism of Action

The electrochemical performance of the cathode was evaluated for air-zinc system in electrochemical cell having two cathodes vs. one anode. Zn anode was produced by electrochemical deposition during the charge operation of zinc from dissolved in electrolyte zincates (30 g of ZnO was dissolved in 1 L of 30% KOH) onto nickel foam. The total amount of precipitated zinc was about 6 g. The working area of each cathode was 60 cm². 5 A (42 mA/cm²) current was used for charge operation and 2 A (17 mA/cm²) for discharge operation. Temperature of electrolyte throughout the test was 27-30° C.

Figure 9:
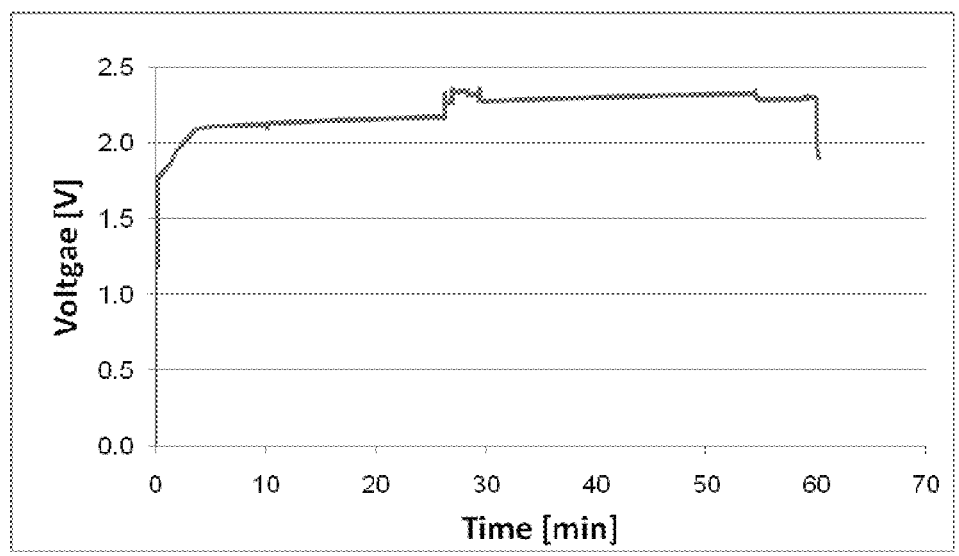
FIG. 9 is a voltage vs. time plot of a rechargeable zinc-air cell comprising electrode of the invention during charge mode.

FIGS. 8 and 9 show, correspondingly, discharge and charge curves. The total charge capacity was 5 Ah and average charge energy 11 Wh. The total discharge capacity was 4.23 Ah and average discharge energy 5.5 Wh.

FIG. 9 depicts the charge operation of an electrode of this invention. The voltage of the first plateau ranges between 2.1-2.2V which corresponds (taking into account the polarizations of both: cathode and anode) to electrochemical formation of silver monoxide according the reaction:

$$2Ag + 2OH^- \rightarrow Ag_2O + H_2O + 2e$$

The voltage of second plateau is about 2.65V. This voltage corresponds to the following electrochemical reaction:

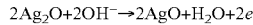

$$2Ag_2O + 2OH^- \rightarrow 2AgO + H_2O + 2e$$

Different to all the other known metal-air (and particularly zinc-air) electrically rechargeable cells or batteries, the metal-air rechargeable cells or batteries of this invention shows during the first 45 min of discharge operation the average voltage of about 1.45-1.5V which corresponds to the AgO→Ag$_2$O→Ag phase transition.

When this reaction is completed the discharge voltage drops to 1.2V which corresponds to the very good cathodic polarization of the air electrode at electrochemical reduction of oxygen.

This test phase transitions of the silver catalyst, provides of the discharge energy increasing for about 10%.

Example 6

Electrochemical Test of Electrodes

Electrochemical test of the electrode in a cycling (bifunctional) mode of operation was carried out at constant current density of 21.5 mA/cm² in the same half cell and at the same conditions used for primary electrochemical performance.

The time of each cycle: anodic (charge) and cathodic (discharge) was 35 minutes.

The electrode's polarization in mV at the end of each cycle, was as follows:

| # of cycle | End of cathodic cycle | End of anodic cycle |
|---|---|---|
| 1 | −20 | +590 |
| 2 | −21 | +598 |
| 3 | −20 | +584 |

After the 3$^{rd}$ cycle the polarization of the electrode remained unchanged for the whole range of applied current densities. Taking into account the electrode's total silver content, the potentials at the end of the anodic cycle corresponded to the end of the silver metal conversion to AgO oxidation process (the final process).

Thus, there is a good indication from the data that electrochemical performance of air electrodes, wherein the reduction of oxygen is catalyzed by a cluster of silver particles comprising ZrO$_2$ particles is advantageous over commercially available electrodes. The electrodes of this invention are expected to be stable at elevated temperatures, at various OCV conditions and when used in a bi-functional mode of operation. The stability of such electrodes is expected for very long periods of time, i.e. hundreds and/or thousands of working hours and for hundreds and/or thousands of cycles.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A tri-functional gas-diffusion electrode comprising:
   a catalyst comprising a plurality of porous agglomerates or porous clusters of silver particles;
   wherein said electrode performs three functions:
   a. catalytic reduction of oxygen (O$_2$) to hydroxide (OH$^-$) ions when said electrode is used as a cathode of an electrochemical cell in a discharge mode;
   b. in alkaline solution, when used at anodic polarization in an electrochemical cell working in a charge mode, the electrode is oxidized such that in a subsequent discharge mode, said electrode provides additional energy;
   c. the electrode functions as a counter/auxiliary electrode for the oxidation of hydroxide (OH$^-$) ions into oxygen (O$_2$) when used as an anode in a charge mode;
   wherein said catalyst further comprises crystalline particles of zirconium oxide (ZrO$_2$) wherein at least a portion of said crystalline particles of ZrO$_2$ is located in pores formed inside the porous agglomerates or porous clusters of silver particles.

2. A tri-functional gas-diffusion electrode comprising:
a catalyst comprising a plurality of porous agglomerates or porous clusters of silver particles;
wherein said electrode performs three functions:
a. catalytic reduction of oxygen ($O_2$) to hydroxide ($OH^-$) ions when said electrode is used as a cathode of an electrochemical cell in a discharge mode;
b. in alkaline solution, when used at anodic polarization in an electrochemical cell working in a charge mode, the electrode is oxidized such that in a subsequent discharge mode, said electrode provides additional energy;
c. the electrode functions as a counter/auxiliary electrode for the oxidation of hydroxide ($OH^-$) ions into oxygen ($O_2$) when used as an anode in a charge mode;
wherein said catalyst further comprises crystalline particles of zirconium oxide ($ZrO_2$) wherein at least a portion of said crystalline particles of $ZrO_2$ is located in pores formed inside the porous agglomerates or porous clusters of silver particles and wherein said $ZrO_2$ particles reside on the surface of said silver particles.

3. A tri-functional gas-diffusion electrode comprising:
a catalyst comprising a plurality of porous agglomerates or porous clusters of silver particles;
wherein said electrode performs three functions:
a. catalytic reduction of oxygen ($O_2$) to hydroxide ($OH^-$) ions when said electrode is used as a cathode of an electrochemical cell in a discharge mode;
b. in alkaline solution, when used at anodic polarization in an electrochemical cell working in a charge mode, the electrode is oxidized such that in a subsequent discharge mode, said electrode provides additional energy;
c. the electrode functions as a counter/auxiliary electrode for the oxidation of hydroxide ($OH^-$) ions into oxygen ($O_2$) when used as an anode in a charge mode;
wherein said catalyst further comprises crystalline particles of zirconium oxide ($ZrO_2$) wherein at least a portion of said crystalline particles of $ZrO_2$ is located in pores formed inside the porous agglomerates or porous clusters of silver particles and wherein the percentage of said $ZrO_2$ in the catalyst ranges between 0.2-2%.

4. A tri-functional gas-diffusion electrode comprising:
a catalyst comprising a plurality of porous agglomerates or porous clusters of silver particles;
wherein said electrode performs three functions:
a. catalytic reduction of oxygen ($O_2$) to hydroxide ($OH^-$) ions when said electrode is used as a cathode of an electrochemical cell in a discharge mode;
b. in alkaline solution, when used at anodic polarization in an electrochemical cell working in a charge mode, the electrode is oxidized such that in a subsequent discharge mode, said electrode provides additional energy;
c. the electrode functions as a counter/auxiliary electrode for the oxidation of hydroxide ($OH^-$) ions into oxygen ($O_2$) when used as an anode in a charge mode;
wherein said catalyst further comprises crystalline particles of zirconium oxide ($ZrO_2$) wherein at least a portion of said crystalline particles of $ZrO_2$ is located in pores formed inside the porous agglomerates or porous clusters of silver particles and wherein the size of said $ZrO_2$ particles ranges between 2-30 nm.

5. A rechargeable cell comprising a tri-functional electrode, wherein said tri-functional electrode comprising:
a catalyst comprising a plurality of porous agglomerates or porous clusters of silver particles,
wherein said electrode performs three functions:
a. the electrode functions as a catalyst for the reduction of oxygen ($O_2$) to hydroxide ($OH^-$) ions when said electrode is used as a cathode in a discharge mode;
b. in alkaline solution, when used at anodic polarization in an electrochemical cell working in a charge mode, the electrode is oxidized such that in a subsequent discharge mode, said electrode provides additional energy;
c. the electrode functions as a counter/auxiliary electrode for the oxidation of hydroxide ($OH^-$) ions into oxygen ($O_2$) when used as an anode in a charge mode;
wherein said catalyst further comprises crystalline secondary particles of zirconium oxide ($ZrO_2$) wherein at least a portion of said crystalline secondary particles of $ZrO_2$ is located in pores formed inside the porous agglomerates or porous clusters of silver particles.

6. A rechargeable cell comprising a tri-functional electrode, wherein said tri-functional electrode comprising:
a catalyst comprising a plurality of porous agglomerates or porous clusters of silver particles,
wherein said electrode performs three functions:
a. the electrode functions as a catalyst for the reduction of oxygen ($O_2$) to hydroxide ($OH^-$) ions when said electrode is used as a cathode in a discharge mode;
b. in alkaline solution, when used at anodic polarization in an electrochemical cell working in a charge mode, the electrode is oxidized such that in a subsequent discharge mode, said electrode provides additional energy;
c. the electrode functions as a counter/auxiliary electrode for the oxidation of hydroxide ($OH^-$) ions into oxygen ($O_2$) when used as an anode in a charge mode;
wherein said catalyst further comprises crystalline secondary particles of zirconium oxide ($ZrO_2$) wherein at least a portion of said crystalline secondary particles of $ZrO_2$ is located in pores formed inside the porous agglomerates or porous clusters of silver particles; and
wherein said $ZrO_2$ particles reside on the surface of said silver particles.

* * * * *